(12) United States Patent
Thomas et al.

(10) Patent No.: US 10,232,572 B2
(45) Date of Patent: Mar. 19, 2019

(54) COMPOSITE FILLER FORMING APPARATUS

(71) Applicant: The Boeing Company, Chicago, IL (US)

(72) Inventors: Charles William Thomas, Issaquah, WA (US); Gabriel Zane Forston, Lake Stevens, WA (US); Benjamin Jeffrey Stephenson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 589 days.

(21) Appl. No.: 14/470,333

(22) Filed: Aug. 27, 2014

(65) Prior Publication Data

US 2016/0101577 A1 Apr. 14, 2016

(51) Int. Cl.
*B29C 70/74* (2006.01)
*B29C 70/50* (2006.01)
*B29D 99/00* (2010.01)
*B29C 70/38* (2006.01)
*B29K 101/10* (2006.01)
*B29K 105/08* (2006.01)
*B29L 31/30* (2006.01)

(52) U.S. Cl.
CPC .......... *B29C 70/745* (2013.01); *B29C 70/386* (2013.01); *B29C 70/50* (2013.01); *B29D 99/0007* (2013.01); *B29K 2101/10* (2013.01); *B29K 2105/0872* (2013.01); *B29L 2031/3076* (2013.01); *Y02T 50/43* (2013.01)

(58) Field of Classification Search
CPC ..... B29C 70/504; B29C 70/526; B29C 70/50; B29C 70/52
See application file for complete search history.

(56) References Cited

U.S. PATENT DOCUMENTS

| | | | | |
|---|---|---|---|---|
| 4,331,723 | A | * 5/1982 | Hamm | ................. B29C 70/865 156/293 |
| 4,559,005 | A | * 12/1985 | Gants | .................... B29C 70/504 425/363 |
| 4,778,545 | A | 10/1988 | Von Derau et al. | |

(Continued)

FOREIGN PATENT DOCUMENTS

| CN | 101472730 A | 7/2009 |
|---|---|---|
| EP | 2006074 A1 | 12/2008 |

OTHER PUBLICATIONS

Extended European Search Report, dated Jan. 19, 2016, regarding Application No. EP15181961.2, 8 pages.

(Continued)

*Primary Examiner* — Matthew J Daniels
(74) *Attorney, Agent, or Firm* — Yee & Associates, P.C.

(57) ABSTRACT

A system and method for forming a composite filler. The method comprises applying a pressure to a first portion of a composite material blank with a pair of forming dies of a composite filler forming apparatus, the pair of forming dies having a pair of convex radii, each forming die of the pair of forming dies having a respective convex radius of the pair of convex radii. The method also repeats the applying step to a subsequent portion of the composite material blank to incrementally form the composite material blank into a desired cross-section along its length.

21 Claims, 17 Drawing Sheets

(56) References Cited

U.S. PATENT DOCUMENTS

| | | | | |
|---|---|---|---|---|
| 4,789,594 | A | * | 12/1988 | Stawski ............... B26D 1/02 156/222 |
| 4,913,910 | A | | 4/1990 | McCarville et al. |
| 5,149,391 | A | * | 9/1992 | Li ...................... B29C 70/504 100/153 |
| 5,352,110 | A | * | 10/1994 | Hayakawa ............ B29C 43/22 264/175 |
| 5,639,535 | A | * | 6/1997 | McCarville ........... B29C 70/30 428/119 |
| 6,231,941 | B1 | * | 5/2001 | Cundiff ................ B29C 70/083 428/36.3 |
| 6,562,436 | B2 | * | 5/2003 | George ................. B32B 5/12 428/105 |
| 6,689,448 | B2 | | 2/2004 | George et al. |
| 6,701,990 | B1 | * | 3/2004 | Burley ................. B29C 53/043 156/463 |
| 6,709,538 | B2 | | 3/2004 | George et al. |
| 7,905,975 | B2 | * | 3/2011 | Suzuki ................. B29C 70/52 156/180 |
| 8,591,685 | B2 | | 11/2013 | Anderson et al. |
| 9,616,594 | B2 | * | 4/2017 | Guzman ............... B29C 70/52 |
| 2002/0031641 | A1 | * | 3/2002 | George ................. B32B 5/12 428/105 |
| 2007/0078050 | A1 | | 4/2007 | Fisher et al. |
| 2008/0053599 | A1 | * | 3/2008 | Aijima ................. B29C 70/50 156/196 |
| 2009/0317587 | A1 | * | 12/2009 | Deobald ............... B29C 70/865 428/119 |
| 2010/0024966 | A1 | * | 2/2010 | Felip ................... B29C 53/265 156/196 |
| 2012/0237736 | A1 | * | 9/2012 | Blot .................... B29C 70/205 428/178 |
| 2013/0105072 | A1 | * | 5/2013 | Anderson ............. B29C 70/52 156/264 |
| 2015/0217508 | A1 | * | 8/2015 | Rossi .................. B29D 99/0007 428/80 |

OTHER PUBLICATIONS

Chapman et al., "Composite Filler," U.S. Appl. No. 14/182,474, filed Feb. 18, 2014, 42 pages.

The State Intellectual Property Office of China, First Notification of Office Action, Search Report, and English Translation, dated Jun. 1, 2018, regarding Application No. 201510489954.1, 10 pages.

* cited by examiner

COMPOSITE FILLER FORMING APPARATUS

BACKGROUND INFORMATION

1. Field

The present disclosure generally relates to composite structures and, in particular, to the fabrication of composite structures. Still more particularly, the present disclosure relates to a method and apparatus for producing composite fillers used to fill gaps in composite structures.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, lightweight materials created by combining two or more functional components. For example, a composite material may include reinforcing fibers bound in polymer resin matrix. The fibers may be unidirectional or may take the form of a woven cloth or fabric. In thermoset composites, fibers and resins are arranged and cured to form a composite material.

When composite structural members are joined together, gaps or voids may be present along bond lines between the members which may need to be filled in order to increase the strength of the bond. For example, in the aircraft industry, composite fuselage stiffeners such as stringers may include a composite filler at the convex radius bond line between the stringer and a fuselage skin. The composite filler is applied in the form of triangular cross-section strips, sometimes referred to as noodles or fillers, which fill the voids at the bond line. The composite filler may be formed from composite materials such as adhesive or prepreg tape.

Composite fillers may be formed using a variety of different methods. However, the conventional techniques may have undesirable manufacturing costs, undesirable manufacturing times, or undesirable composite filler quality. Therefore, it would be desirable to have a method and apparatus that take into account at least some of the issues discussed above, as well as other possible issues.

SUMMARY

An illustrative embodiment of the present disclosure provides a method. The method comprises applying a pressure to a first portion of a composite material blank with a pair of forming dies of a composite filler forming apparatus, the pair of forming dies having a pair of convex radii, each forming die of the pair of forming dies having a respective convex radius of the pair of convex radii. The method also repeats the applying step to a subsequent portion of the composite material blank to incrementally form the composite material blank into a desired cross-section along its length.

A further illustrative embodiment of the present disclosure provides an apparatus. The apparatus comprises a base that carries a composite material blank, a pair of forming dies having a pair of convex radii, and a number of actuators associated with the pair of forming dies. Each forming die of the pair of forming dies has a respective convex radius of the pair of convex radii. The pair of forming dies is positioned to form a first side and a second side of a substantially triangular cross-section in the composite material blank. The number of actuators move the pair of forming dies such that a pressure is applied to a portion of the composite material blank with the pair of forming dies.

Another illustrative embodiment of the present disclosure provides a method. The method comprises compressing a first portion of a composite material blank with respective convex radii of a pair of forming dies such that a substantially triangular cross-section is formed in the first portion of the composite material blank. The method further advances the composite material blank a designated distance after compressing the first portion of composite material blank. The method also compresses a second portion of the composite material blank with the respective convex radii of the pair of forming dies such that the substantially triangular cross-section is formed in the second portion of the composite material blank.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
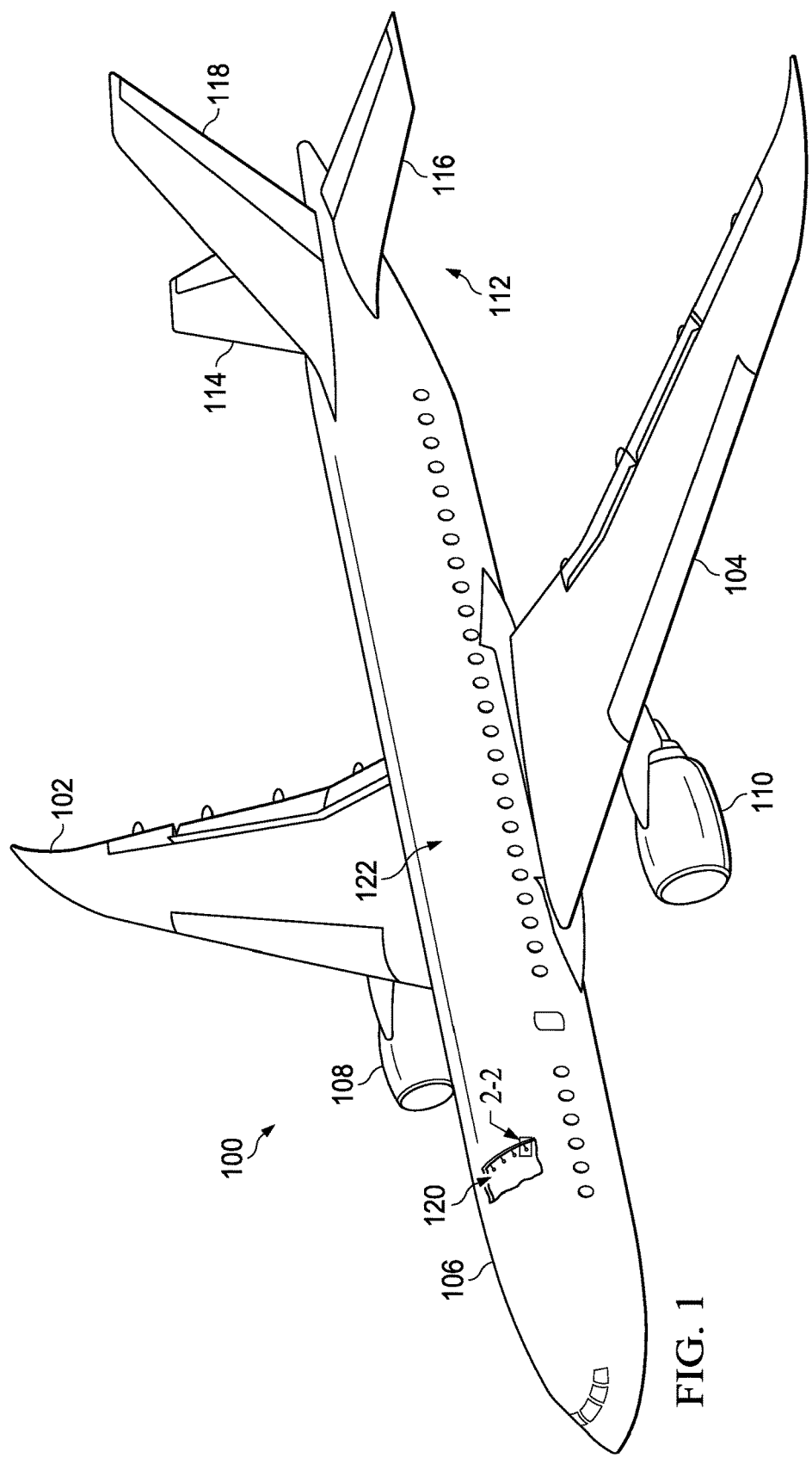
FIG. 1 is an illustration of an aircraft in accordance with an illustrative embodiment.

The illustrative embodiments recognize and take into account one or more different considerations. The illustrative embodiments recognize and take into account that composite fillers may be formed by pulling a composite material through a series of rollers. Using a series of rollers to form composite fillers may be referred to as a continuous process. By pulling a composite material through a series of rollers, the composite material may be incrementally formed along its length. However, pulling composite material through a series of rollers may result in a composite filler having undesirable quality. For example, pulling composite material through a series of rollers may result in distortion of the composite material. Further, pulling composite material through a series of rollers may create "fuzzballs." "Fuzzballs" may be visual inconsistencies caused by rubbing of the composite material.

The illustrative embodiments recognize and take into account that the undesirable quality of the resulting composite filler may be a result of the application of forming pressure almost instantaneously at the tangent of the roller. The illustrative embodiments further recognize and take into account that the undesirable quality of the resulting composite filler may be a result of the high pulling force for moving the composite material through the rollers.

The illustrative embodiments further recognize and take into account that composite fillers may be formed by die forming. Die forming results in a higher quality composite filler than using rollers. However, die forming with full length dies has a higher manufacturing time. Die forming with full length dies may also have higher manufacturing costs as each pair of dies is unique to a shape of a composite filler.

The illustrative embodiments further recognize and take into account that a composite filler may have a varying cross-section along the length of the composite filler. The illustrative embodiments recognize and take into account that having a composite forming tool capable of forming composite fillers having varying cross-sections may be desirable.

The illustrative embodiments also recognize and take into account that composite fillers may be used in different locations. Composite fillers placed between different composite structures may have different cross-sections. The illustrative embodiments further recognize and take into account that having a composite filler forming tool capable of forming composite fillers of different cross-sections may reduce manufacturing costs.

The illustrative embodiments further recognize and take into account that parameters for forming a composite material include temperature, pressure, and time. By increasing any one of temperature, pressure, and time, the other two parameters may be reduced and result in a product of desirable quality. Thus, the illustrative embodiments recognize and take into account that increasing the pressure applied to a composite material may allow the time of application of pressure to be decreased. By decreasing the time of application of pressure, composite filler manufacturing times may be decreased.

Further, the illustrative embodiments recognize and take into account that composite fillers may be formed from composite material blanks. The illustrative embodiments recognize and take into account that composite material blanks may have different cross-sections. Accordingly, the illustrative embodiments recognize and take into account that it may be desirable to provide a composite filler forming apparatus capable of forming composite fillers of desirable quality from composite material blanks of a variety of different cross-sections.

The illustrative embodiments further recognize and take into account that forming composite material blanks incrementally along their length may allow for a continuous process. Forming composite material blanks in a continuous process may reduce the manufacturing time for forming composite fillers.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a composite filler may be implemented in accordance with an illustrative embodiment. For example, composite fillers may be placed between stiffeners 120 and composite skin 122 of aircraft 100. FIG. 1 depicts an exposed view of stiffeners 120.

This illustration of aircraft 100 is provided for purposes of illustrating one environment in which the different illustrative embodiments may be implemented. The illustration of aircraft 100 in FIG. 1 is not meant to imply architectural limitations to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable types of aircraft.

Figure 2:
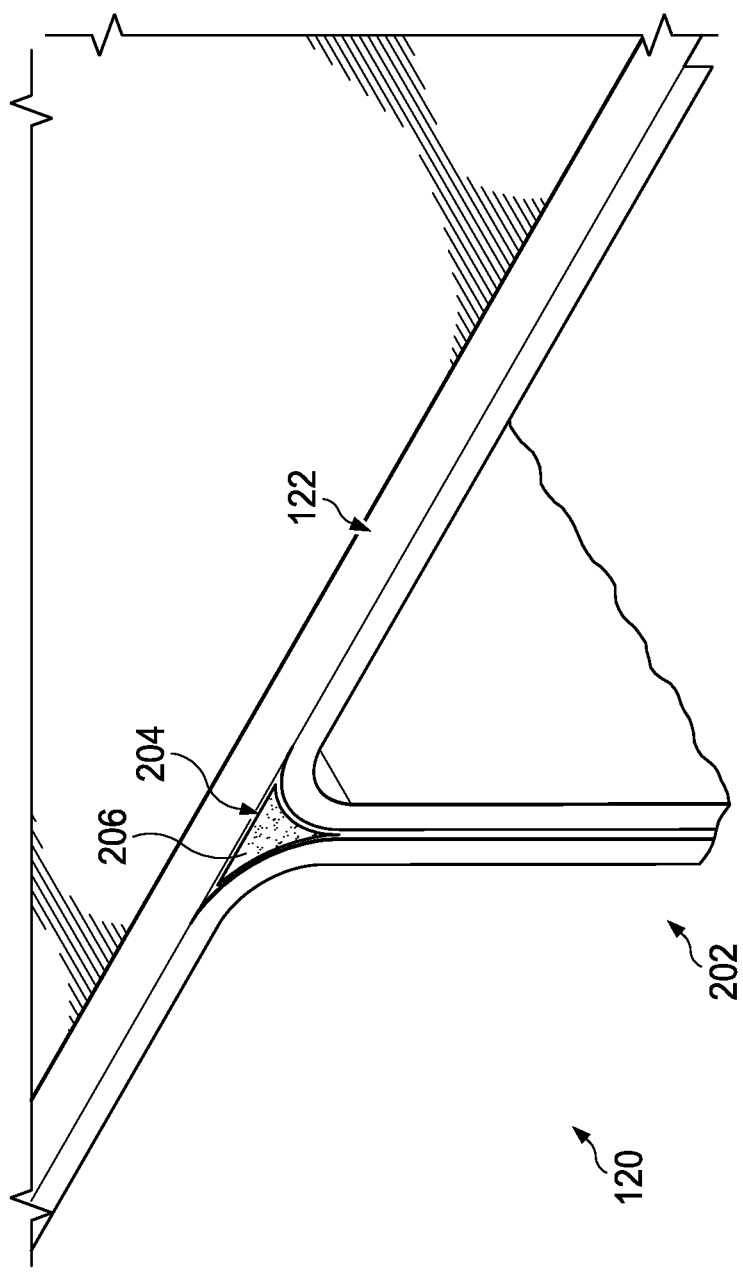
FIG. 2 is an illustration of an isometric view of a composite filler and a number of composite members in accordance with an illustrative embodiment.

Turning now to FIG. 2, an illustration of an isometric view of a composite filler and a number of composite members is depicted in accordance with an illustrative embodiment. Specifically, FIG. 2 is an enlarged view of stiffener 202 in stiffeners 120 in section 2-2 of FIG. 1. As depicted, composite filler 204 is placed in gap 206 formed by stiffener 202 and composite skin 122. In this illustrative example, composite filler 204 has a substantially triangular cross-section. Composite skin 122 is a composite member. Stiffener 202 is also a composite member. Although stiffener 202 is a single composite member, in some illustrative examples, stiffener 202 may instead be two or more composite members. In some illustrative examples, stiffener 202 is a composite stringer.

Figure 3:
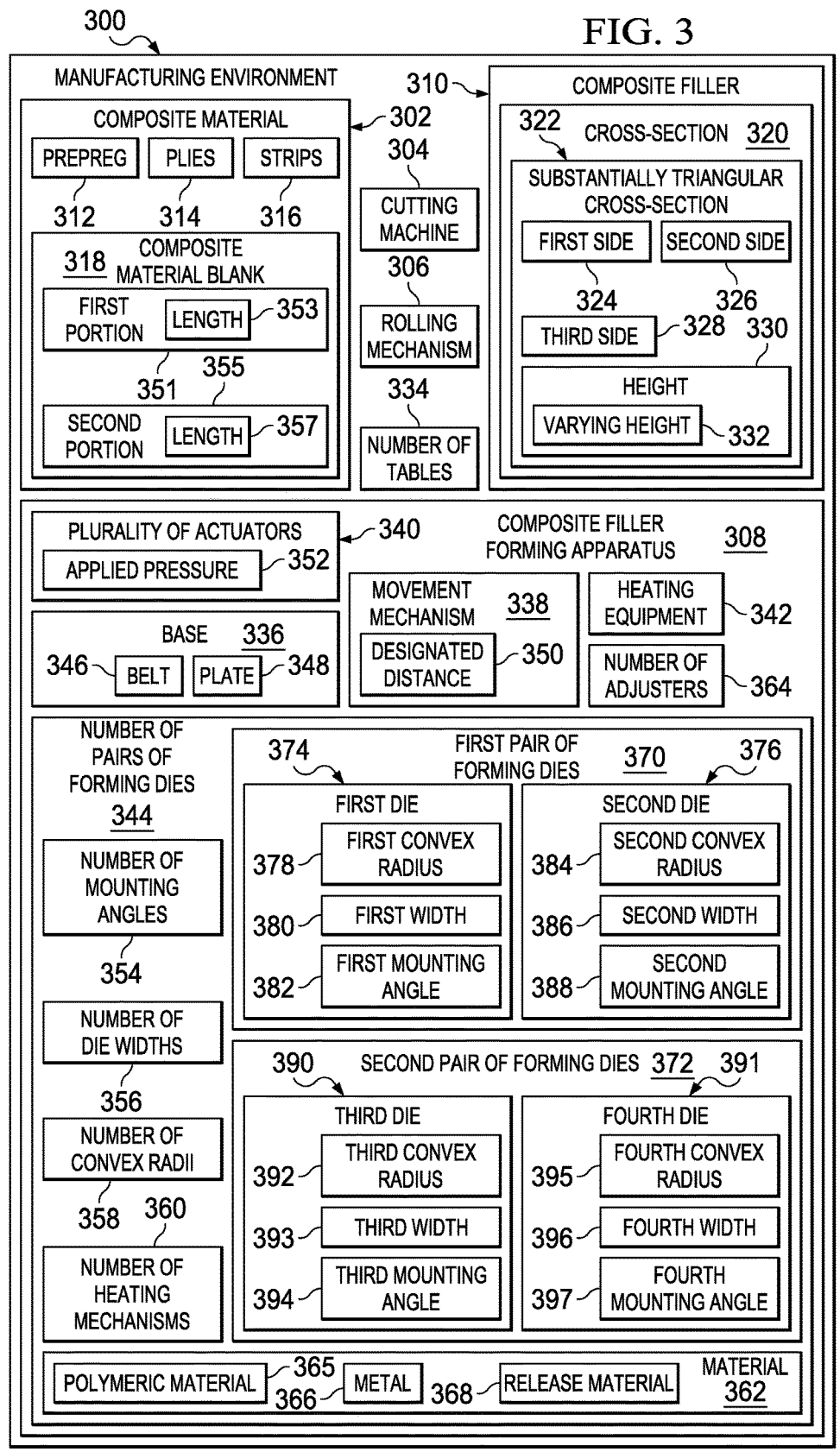
FIG. 3 is an illustration of a block diagram of a manufacturing environment in accordance with an illustrative embodiment.

Turning now to FIG. 3, an illustration of a block diagram of a manufacturing environment is depicted in accordance with an illustrative embodiment. Manufacturing environment 300 may be used to form a composite filler such as composite filler 204 of FIG. 2.

Manufacturing environment 300 has composite material 302, cutting machine 304, rolling mechanism 306, composite filler forming apparatus 308, and composite filler 310. Composite material 302 may be formed into composite filler 310 using at least one of cutting machine 304, rolling mechanism 306, or composite filler forming apparatus 308. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Composite material 302 includes prepreg 312. Prepreg 312 is a preimpregnated composite material. Prepreg 312 may be cut by cutting machine 304 into plies 314. Prepreg 312 may be cut by cutting machine 304 into strips 316. At least one of plies 314 or strips 316 may be rolled into composite material blank 318. Rolling at least one of plies 314 or strips 316 may be performed by rolling mechanism 306.

Composite filler forming apparatus 308 forms composite filler 310 from composite material blank 318. Specifically, composite filler forming apparatus 308 forms a composite blank into a composite filler incrementally. Composite filler forming apparatus 308 incrementally forms the composite blank along its length. In some illustrative examples, composite material blank 318 may be sent through composite filler forming apparatus 308 to form composite filler 310. Composite material blank 318 may have a substantially round cross-section, a substantially triangular cross-section, or some other desirable cross-section.

Composite filler 310 has cross-section 320. Composite filler forming apparatus 308 forms cross-section 320 into composite material blank 318. In some examples, cross-section 320 is substantially triangular cross-section 322. Substantially triangular cross-section 322 has first side 324, second side 326, and third side 328. In some examples, first side 324 and second side 326 are substantially mirror images of each other. In some examples, first side 324 and second side 326 have substantially different shapes.

Substantially triangular cross-section 322 has height 330. In some illustrative examples, height 330 is varying height 332.

In some illustrative examples, composite filler forming apparatus 308 may be associated with number of tables 334. Number of tables 334 is a number of elongated structures. Number of tables 334 may be used for at least one of holding, storing, or transporting at least one of composite material blank 318 or composite filler 310. In these illustrative examples, composite material blank 318 may be sent through composite filler forming apparatus 308. Composite material blank 318 may be held on number of tables 334 prior to sending composite material blank 318 through composite filler forming apparatus 308. Resulting composite filler 310 may be held on number of tables 334 after forming.

Composite filler forming apparatus 308 has base 336, movement mechanism 338, plurality of actuators 340, heating equipment 342, and number of pairs of forming dies 344. As used herein, "a number of," when used with reference to items means one or more items.

Composite material blank 318 rests on base 336 during forming. In some illustrative examples, base 336 carries composite material blank 318 as composite material blank 318 moves through composite filler forming apparatus 308. In some illustrative examples, base 336 is belt 346. Belt 346 may take the form of a continuous belt. When belt 346 is continuous, belt 346 runs axially along a table in number of tables 334 through number of pairs of forming dies 344. In some illustrative examples, base 336 is plate 348. In some examples, plate 348 passes through number of pairs of forming dies 344 during forming of composite material blank 318. In some examples, number of pairs of forming dies 344 move relative to plate 348 during forming of composite material blank 318.

Movement mechanism 338 moves at least one of base 336 or number of pairs of forming dies 344 relative to each other. In some illustrative examples, movement mechanism 338 includes a number of motors which move base 336 along a table in number of tables 334 into number of pairs of forming dies 344. In some illustrative examples, movement mechanism 338 includes a number of motors which move number of pairs of forming dies 344 along a table in number of tables 334 relative to base 336.

Movement mechanism 338 moves one of base 336 and number of pairs of forming dies 344 to designated distance 350. In some illustrative examples, designated distance 350 is about the same as a width of a pair of forming dies in number of pairs of forming dies 344. In some illustrative examples, designated distance 350 is less than a width of a pair of forming dies of number of pairs of forming dies 344. In some illustrative examples, designated distance 350 is greater than a width of a pair of forming dies in number of pairs of forming dies 344.

When designated distance 350 is the same as a width of a pair of forming dies, composite material blank 318 may be formed into composite filler 310 by portions having lengths equivalent to the width of the pair of forming dies, such as first portion 351 having length 353 and second portion 355 having length 357. In other words, each portion of composite material blank 318 may only be impacted once by a pair of forming dies. When designated distance 350 is less than a width of a pair of forming dies, parts of composite material blank 318 may be impacted at least twice by a pair of forming dies. For example, part of first portion 351 may be part of second portion 355. This part of first portion 351 may be impacted twice by a pair of forming dies.

Designated distance 350 may also be referred to as an increment. By moving composite material blank 318 by increments, composite material blank 318 may be formed incrementally along its length. In other words, cross-section 320 may be formed incrementally into composite material blank 318 along its length to form composite filler 310.

Plurality of actuators 340 are connected to number of pairs of forming dies 344 to form composite material 302 into composite filler 310. Plurality of actuators 340 supply applied pressure 352 to number of pairs of forming dies 344 to change the shape of composite material 302. Applied pressure 352 is sufficient to shape composite material blank 318 into composite filler 310 having cross-section 320. In some illustrative examples, applied pressure 352 is sufficient to form composite filler 310 without heating composite material 302. Further, applied pressure 352 is sufficient to form composite filler 310 within a desired period of time. By increasing applied pressure 352, manufacturing time for composite filler 310 may be decreased.

Number of pairs of forming dies 344 has number of mounting angles 354, number of die widths 356, number of convex radii 358, number of heating mechanisms 360, and material 362. Number of mounting angles 354 influences the shape of first side 324 and second side 326 of composite filler 310. Number of mounting angles 354 influences the direction of force applied to composite filler 310 relative to third side 328.

In some illustrative examples, number of mounting angles 354 may be adjusted by number of adjusters 364. In some illustrative examples, number of adjusters 364 may include a number of adjustment plates. Number of mounting angles 354 may be changed based on a cross-section of composite material blank 318. For example, number of mounting angles 354 may be different if composite material blank 318 has a substantially circular cross-section or a substantially triangular cross-section.

Number of die widths 356 affects the length of composite material blank 318 formed during each pressing. The greater the width of number of die widths 356, the more of composite material blank 318 is formed during each pressing. In some illustrative examples, number of die widths 356 may be from about one inch to about six inches.

Number of convex radii 358 influences the shape of first side 324 and second side 326 of composite filler 310. In some illustrative examples, number of convex radii 358 is the same. In some illustrative examples, each of number of convex radii 358 is different.

Composite filler forming apparatus 308 may optionally include number of heating mechanisms 360. Number of heating mechanisms 360 may be positioned in different areas of composite filler forming apparatus 308. In one illustrative example, number of heating mechanisms 360 includes a heating unit prior to number of pairs of forming dies 344. In this example, composite material 302 is sent through the heating unit prior to entering number of pairs of forming dies 344.

In one illustrative example, number of pairs of forming dies 344 is within a heating unit. In this example, composite material 302 is heated as it is formed by number of pairs of forming dies 344. In another illustrative example, each forming die of number of pairs of forming dies 344 contains a heating element of number of heating mechanisms 360. In this illustrative example, composite material 302 is heated as it is formed by number of pairs of forming dies 344.

Material 362 of number of pairs of forming dies 344 is selected to provide a desired strength. The desired strength is sufficient for forming composite material 302 into composite filler 310. Material 362 of number of pairs of forming dies 344 may also be selected for desirable wear characteristics.

Material 362 may be selected from at least one of polymeric material 365, metal 366, or release material 368. Release material 368 may be placed over polymeric material 365 or metal 366 to allow for ease of removal of number of pairs of forming dies 344 from composite material 302.

As depicted, number of pairs of forming dies 344 includes first pair of forming dies 370 and second pair of forming dies 372. First pair of forming dies 370 has a pair of convex radii. Each forming die of first pair of forming dies 370 has a respective convex radius of the pair of convex radii. First pair of forming dies 370 includes first die 374 and second die 376. First die 374 has first convex radius 378, first width 380, and first mounting angle 382. Second die 376 has second convex radius 384, second width 386, and second mounting angle 388. In some illustrative examples, first convex radius 378 and second convex radius 384 are the same. In some illustrative examples, first convex radius 378 and second convex radius 384 are different.

In some illustrative examples, composite filler 310 may be formed using only first pair of forming dies 370. In these illustrative examples, first pair of forming dies 370 is positioned to form first side 324 and second side 326 of substantially triangular cross-section 322 in composite material blank 318.

Second pair of forming dies 372 has a second pair of convex radii. Each forming die of second pair of forming dies 372 has a respective convex radius of the second pair of convex radii. Second pair of forming dies 372 includes third die 390 and fourth die 391. Third die 390 has third convex radius 392, third width 393, and third mounting angle 394. Fourth die 391 includes fourth convex radius 395, fourth width 396, and fourth mounting angle 397.

In some illustrative examples, composite filler 310 may be formed using both first pair of forming dies 370 and second pair of forming dies 372. For example, first pair of forming dies 370 may form a first cross-section into first portion 351 of composite material blank 318 while second pair of forming dies 372 may form a second cross-section into second portion 355 of composite material blank 318. As another example, both first pair of forming dies 370 and second pair of forming dies 372 may form substantially triangular cross-section 322 into first portion 351 and second portion 355 simultaneously. As yet another example, first pair of forming dies 370 may first apply pressure to first portion 351. Afterwards, second pair of forming dies 372 may apply pressure to first portion 351. In one example, second pair of forming dies 372 may change the cross-section of first portion 351 based on at least one of third convex radius 392, fourth convex radius 395, third mounting angle 394, or fourth mounting angle 397. In another example, second pair of forming dies 372 may not change the cross-section of first portion 351.

In some illustrative examples, composite filler 310 may be formed using only second pair of forming dies 372. In these illustrative examples, second pair of forming dies 372 is positioned to form first side 324 and second side 326 of substantially triangular cross-section 322 in composite material blank 318.

In forming composite filler 310 using composite filler forming apparatus 308, composite material blank 318 is positioned relative to number of pairs of forming dies 344.

Composite material blank 318 rests on base 336. First pair of forming dies 370 applies pressure to first portion 351 of composite material blank 318. Length 353 of first portion 351 is substantially equivalent to first width 380 and second width 386 of first pair of forming dies 370. First convex radius 378, second convex radius 384, and base 336 form substantially triangular cross-section 322 into composite material blank 318. Specifically, first convex radius 378 forms first side 324, second convex radius 384 forms second side 326, and base 336 forms third side 328.

Afterwards, at least one of first pair of forming dies 370 or composite material blank 318 is moved relative to the other. In some illustrative examples, composite material blank 318 is moved to designated distance 350 on base 336. In some illustrative examples, number of pairs of forming dies 370 is moved relative to base 336.

Next, first pair of forming dies 370 applies pressure to second portion 355 of composite material blank 318. Second portion 355 of composite material blank 318 has length 357. Length 357 is substantially equivalent to first width 380 and second width 386.

When designated distance 350 is substantially similar to first width 380 and second width 386, first portion 351 and second portion 355 may not overlap. In some examples, designated distance 350 may be less than first width 380 and second width 386, causing parts of first portion 351 and second portion 355 to overlap. In other words, part of first portion 351 is also part of second portion 355.

In some examples, designated distance 350 may be greater than first width 380 and second width 386. In these examples, portions of composite material blank 318 between first portion 351 and second portion 355 may be formed by other pairs of forming dies of number of pairs of forming dies 344. These portions between first portion 351 and second portion 355 may be formed prior to, following, or simultaneously with the forming of first portion 351. For example, a portion between first portion 351 and second portion 355 may be formed by second pair of forming dies 372 prior to forming first portion 351 with first pair of forming dies 370.

Figure 4:
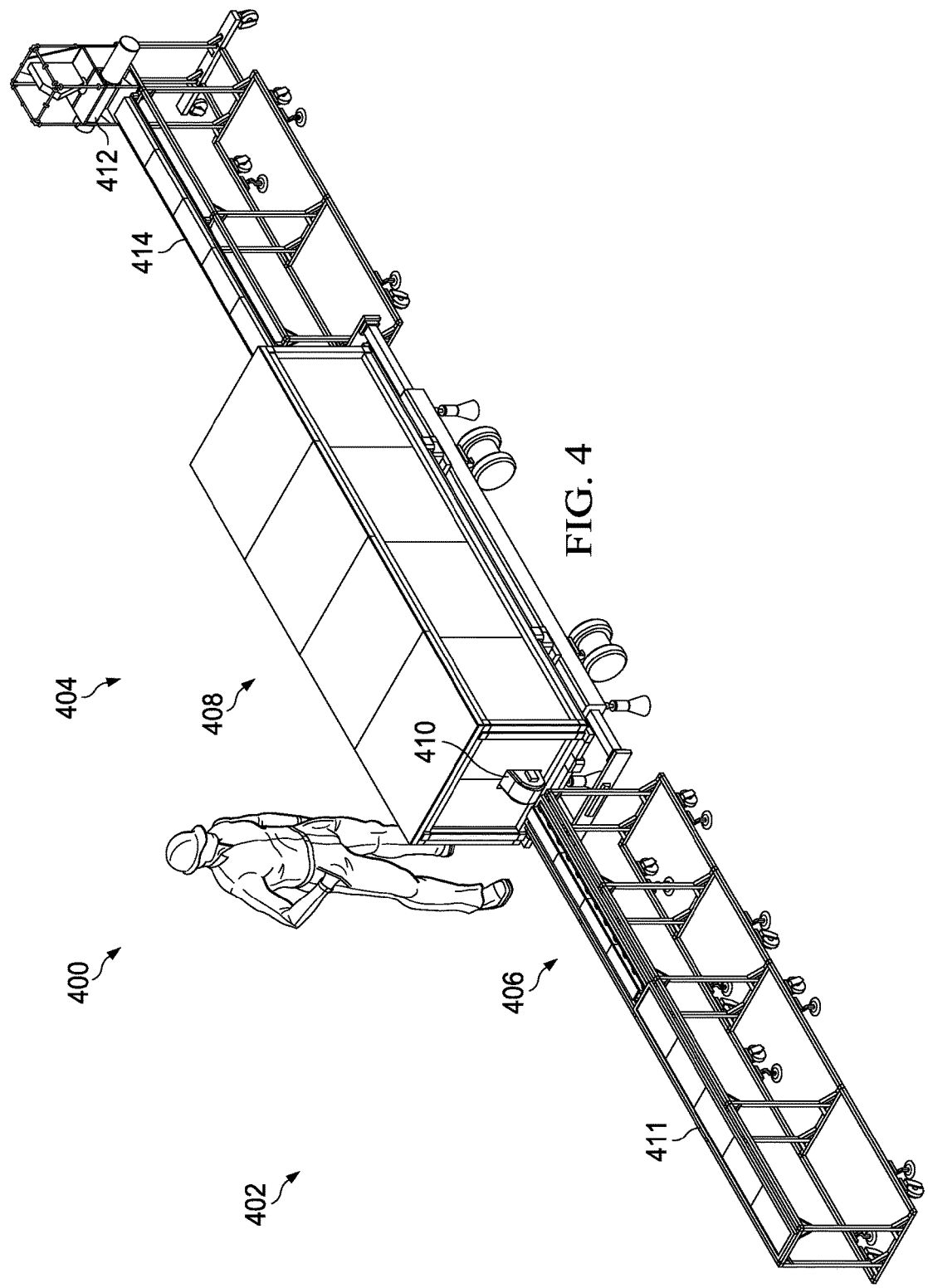
FIG. 4 is an illustration of a physical implementation of a manufacturing environment in accordance with an illustrative embodiment.

Turning now to FIG. 4, an illustration of a physical implementation of a manufacturing environment is depicted in accordance with an illustrative embodiment. Manufacturing environment 400 may be a physical implementation of manufacturing environment 300 of FIG. 3.

Manufacturing environment 400 includes composite filler forming apparatus 402. Composite filler forming apparatus 402 is associated with number of tables 404. Composite filler forming apparatus 402 includes base 406 and heating equipment 408. Base 406 includes belt 410 which is a continuous belt. A composite material blank may be placed onto first table 411 of number of tables 404. In some illustrative examples, the composite material blank may be placed onto first table 411 when first table 411 is adjacent to heating equipment 408. In other illustrative examples, the composite material blank may be placed onto first table 411. Then, first table 411 may be moved until adjacent to heating equipment 408.

The composite material blank may travel through heating equipment 408 on belt 410 of base 406. In this depicted example, heating equipment 408 takes the form of a heating container. A number of pairs of forming dies are positioned within heating equipment 408. As a result, a composite material blank may be formed by the number of pairs of forming dies as the composite material blank is heated within heating equipment 408. In this depicted example, manufacturing environment 400 further includes winch 412.

Winch 412 may maintain a desired level of tautness in composite material filler following forming. Further, winch 412 may maintain a desired level of tautness in a composite material blank for sending the composite material blank through composite filler forming apparatus 402. Winch 412 may move in increments equivalent to increments of belt 410. In other words, when belt 410 moves a designated distance, winch 412 would likewise move the designated distance. By moving belt 410 in increments, a composite material blank may be formed incrementally along its length.

As the resulting composite filler exits heating equipment 408, the composite filler may rest on second table 414 of number of tables 404. Second table 414 may be wheeled away from heating equipment 408 to transport the composite filler following forming.

Figure 5:
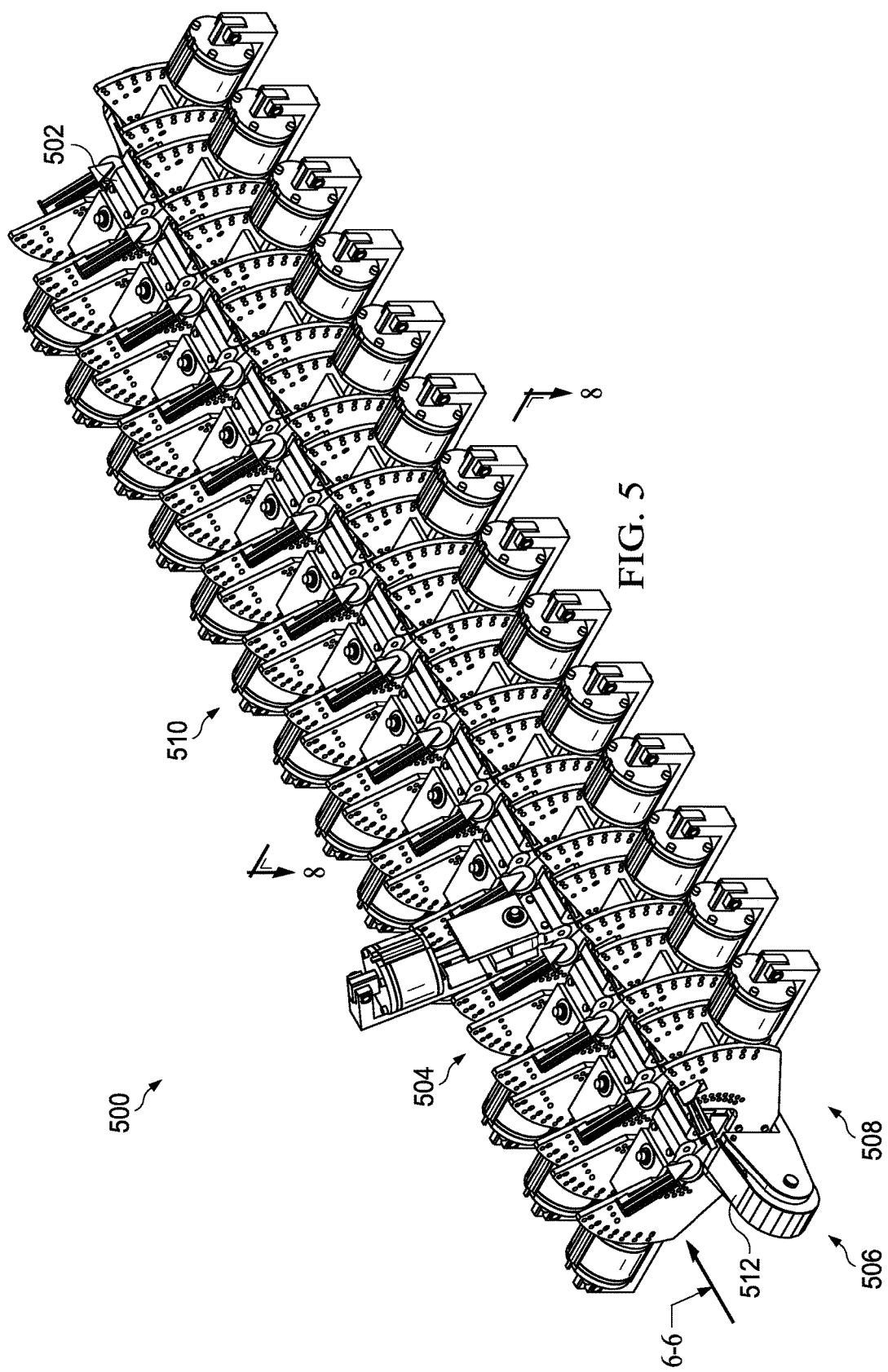
FIG. 5 is an illustration of an isometric view of a composite filler forming apparatus in accordance with an illustrative embodiment.

Turning now to FIG. 5, an illustration of an isometric view of a composite filler forming apparatus is depicted in accordance with an illustrative embodiment. Composite filler forming apparatus 500 is a physical implementation of composite filler forming apparatus 308 of FIG. 3. Composite filler forming apparatus 500 may be a portion of composite filler forming apparatus 402 positioned within heating equipment 408 of FIG. 4.

Composite filler forming apparatus 500 includes number of pairs of forming dies 502, number of adjusters 504, base 506, movement mechanism 508, and plurality of actuators 510. Number of pairs of forming dies 502 is positioned in the center of composite filler forming apparatus 500 to impact a composite material blank. Each forming die of number of pairs of forming dies 502 has a respective convex radius. In some illustrative examples, number of pairs of forming dies 502 may include a plurality of pairs of forming dies, each pair of forming dies having different convex radii than each other pair. In some illustrative examples, number of pairs of forming dies 502 may include a plurality of pairs of forming dies, in which at least two pairs of forming dies have the same convex radii.

Number of adjusters 504 is associated with number of pairs of forming dies 502. Specifically, each adjuster of number of adjusters 504 is associated with a forming die of number of pairs of forming dies 502. Number of adjusters 504 is used to adjust the angle of number of pairs of forming dies 502 relative to base 506. In forming a composite filler, base 506 carries a composite material blank. As depicted, base 506 is a belt. Specifically, base 506 is continuous belt 512. Continuous belt 512 moves below each of number of pairs of forming dies 502. Continuous belt 512 may convey a composite material blank through composite filler forming apparatus 500 to form a composite filler. Continuous belt 512 may move a composite material blank in increments. When continuous belt 512 moves a composite material blank through composite filler forming apparatus 500, the composite material blank may be incrementally formed along its length.

Movement mechanism 508 provides movement of a composite material blank relative to number of pairs of forming dies 502. As depicted, movement mechanism 508 may move continuous belt 512 through composite filler forming apparatus 500.

Plurality of actuators 510 is associated with number of pairs of forming dies 502. Plurality of actuators 510 supplies a force for forming a composite material blank by number of pairs of forming dies 502. In some illustrative examples, plurality of actuators 510 may provide sufficient force to form the composite material blank without heating the composite material blank. In some illustrative examples, plurality of actuators 510 may provide sufficient force to form the composite material blank within a desired period of time. A pair of actuators of plurality of actuators 510 may be actuated to compress a composite material blank by a first pair of forming dies of number of pairs of forming dies 502.

Figure 6:
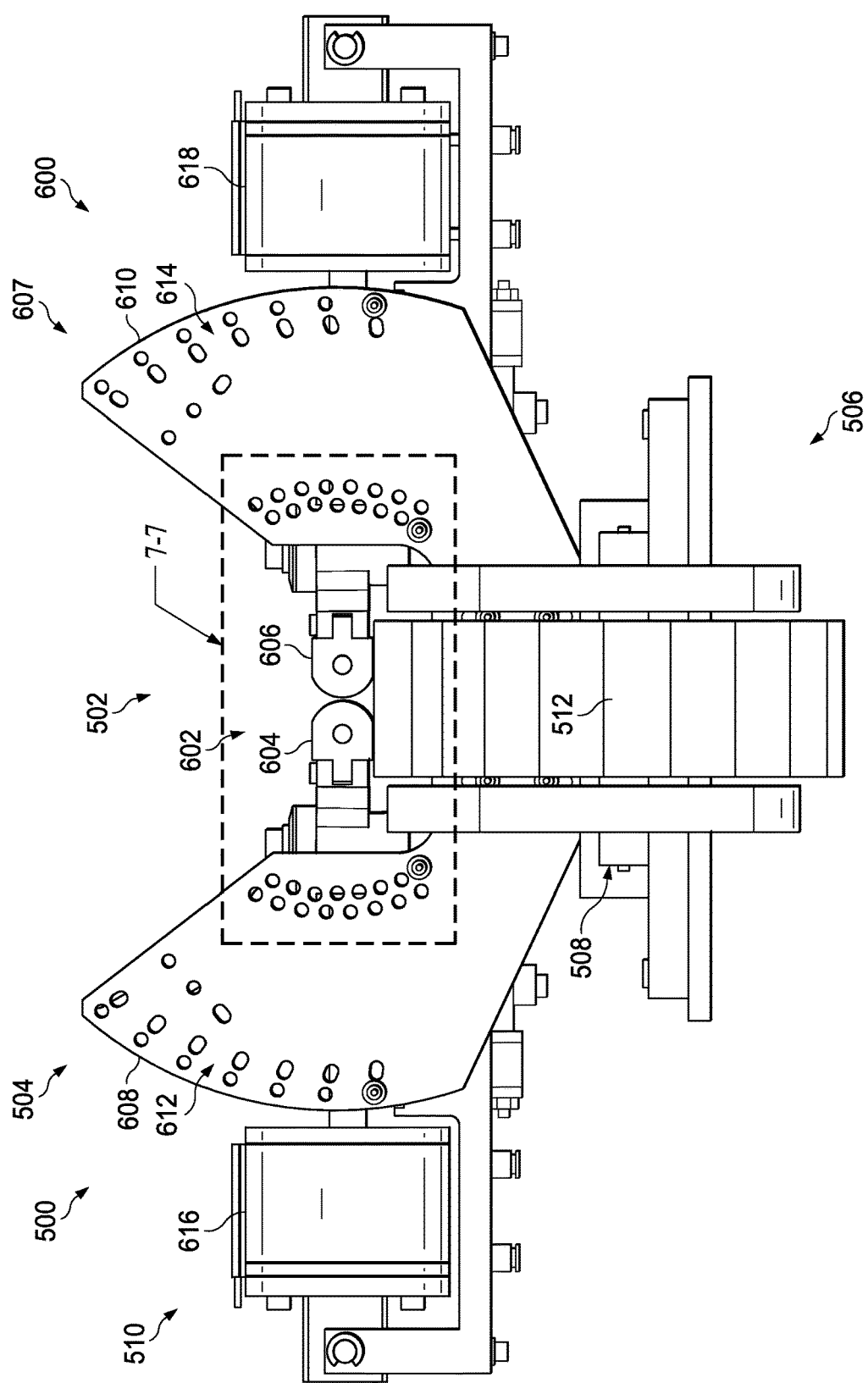
FIG. 6 is an illustration of a front view of a composite filler forming apparatus in accordance with an illustrative embodiment.

Turning now to FIG. 6, an illustration of a front view of a composite filler forming apparatus is depicted in accordance with an illustrative embodiment. View 600 is a view of composite filler forming apparatus 500 from direction 6-6 in FIG. 5.

As can be seen from view 600, number of pairs of forming dies 502 includes first pair of forming dies 602. First pair of forming dies 602 has first die 604 and second die 606. Number of adjusters 504 is associated with number of pairs of forming dies 502. Number of adjusters 504 includes number of adjusters 607. During forming, number of adjusters 607 holds first pair of forming dies 602 at respective angles relative to the composite material blank.

Number of adjusters 607 includes first adjuster 608 and second adjuster 610. As depicted, first adjuster 608 and second adjuster 610 are associated with first pair of forming dies 602. First adjuster 608 may adjust the angle of first die 604 relative to continuous belt 512. First adjuster 608 has plurality of holes 612 which may interact with fasteners to hold first die 604 at an angle. Second adjuster 610 may adjust the angle of second die 606 relative to continuous belt 512. First adjuster 608 has plurality of holes 614 which may interact with fasteners to hold second die 606 at an angle.

Plurality of actuators 510 includes first actuator 616 and second actuator 618. First actuator 616 is associated with first die 604. First actuator 616 provides pressure for compressing a composite material blank using first die 604. Second actuator 618 is associated with second die 606. Second actuator 618 provides pressure for compressing a composite material blank using second die 606. In other words, first actuator 616 and second actuator 618 are a number of actuators associated with first pair of forming dies 602, wherein the number of actuators move first pair of forming dies 602 such that a pressure is applied to a portion of the composite material blank with first pair of forming dies 602.

Figure 7:
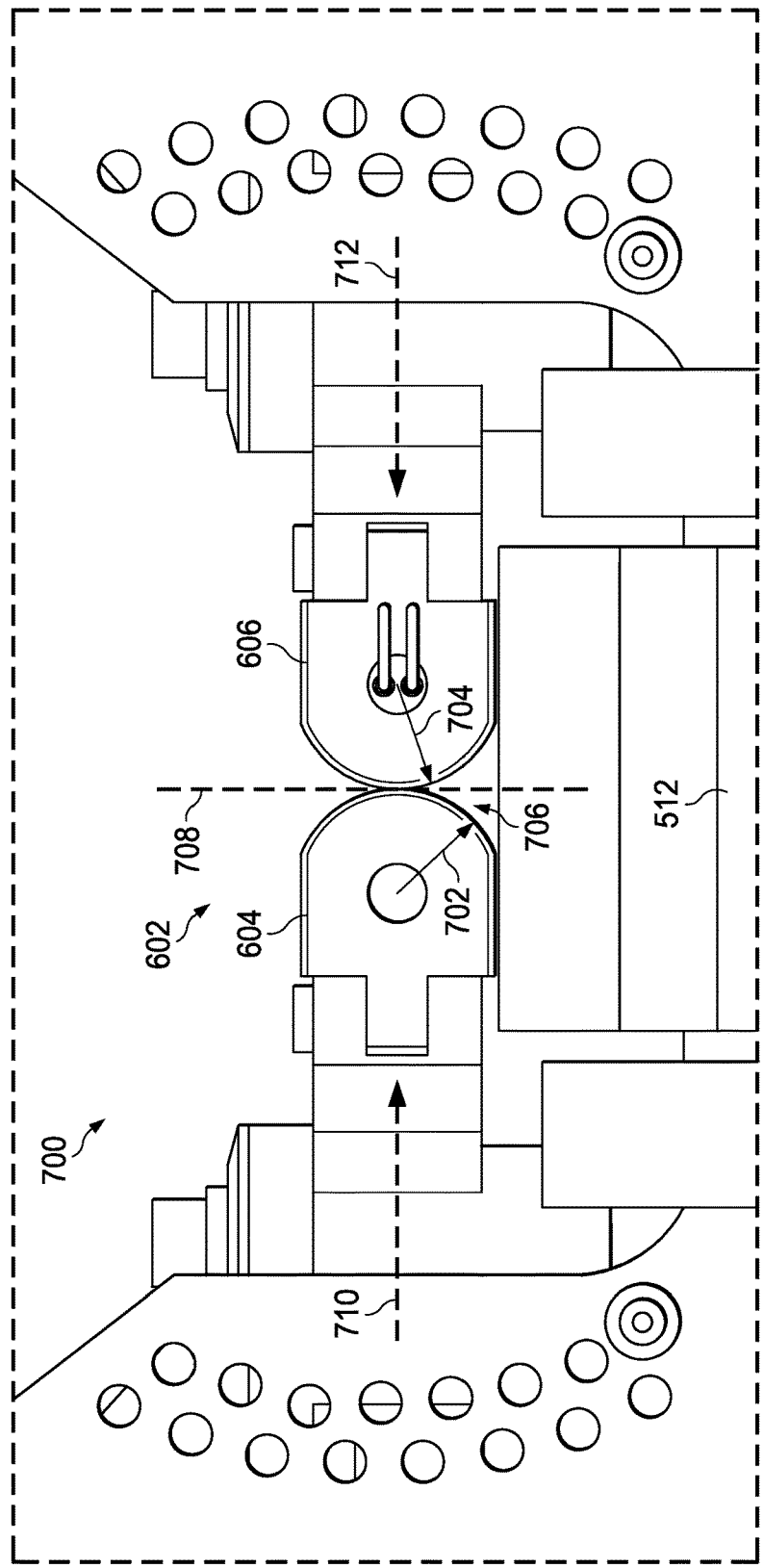
FIG. 7 is an illustration of an enlarged front view of a composite filler forming apparatus in accordance with an illustrative embodiment.

Turning now to FIG. 7, an illustration of an enlarged front view of a composite filler forming apparatus is depicted in accordance with an illustrative embodiment. View 700 is an enlarged view within box 7-7 of FIG. 6.

First pair of forming dies 602 has a pair of convex radii. Each die of first pair of forming dies 602 has a respective convex radius of the pair of convex radii. First die 604 has convex radius 702. Second die 606 has convex radius 704. As depicted, convex radius 702 and convex radius 704 are the same. Convex radius 702, convex radius 704, and continuous belt 512 form triangular cross-section 706. As depicted, triangular cross-section 706 is symmetric about axis 708. Triangular cross-section 706 is symmetric about axis 708 because convex radius 702 and convex radius 704 are the same.

First pair of forming dies 602 is positioned to form a first side and a second side of a substantially triangular cross-section in the composite material blank. In compressing a composite material blank, first die 604 moves in and applies pressure in direction 710. Direction 710 is about perpendicular to the surface of continuous belt 512. In compressing a composite material blank, second die 606 moves in and applies pressure in direction 712. Direction 712 is about perpendicular to the surface of continuous belt 512.

Figure 8:
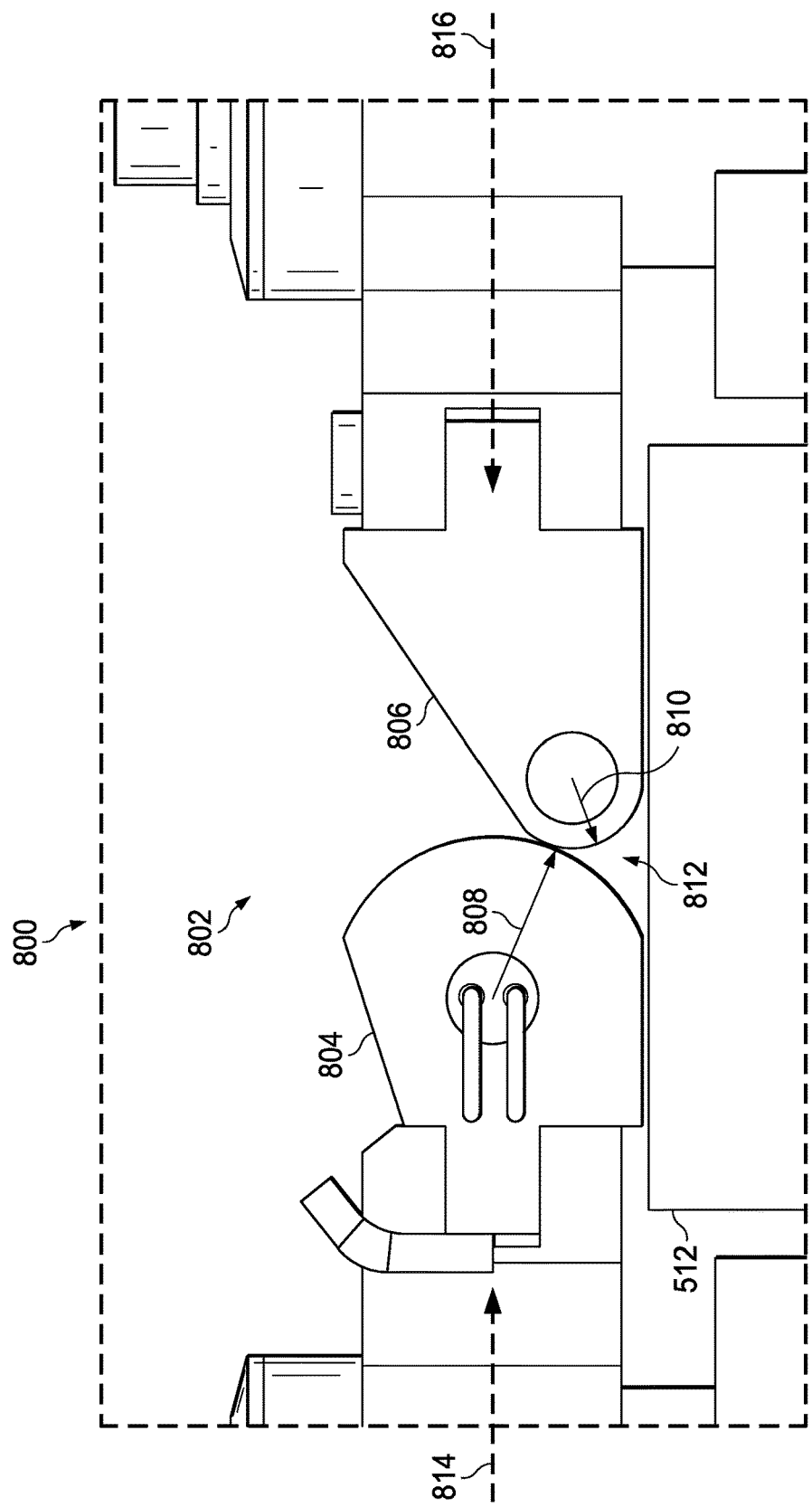
FIG. 8 is an illustration of an enlarged cross-sectional view of a composite filler forming apparatus in accordance with an illustrative embodiment.

Turning now to FIG. 8, an illustration of an enlarged cross-sectional view of a composite filler forming apparatus is depicted in accordance with an illustrative embodiment. View 800 is an enlarged view of a pair of forming dies of composite filler forming apparatus 500 along cross-section 8-8 in FIG. 5.

Second pair of forming dies 802 is a pair of forming dies of number of pairs of forming dies 502. Second pair of forming dies 802 includes third die 804 and fourth die 806. Second pair of forming dies has a second pair of convex radii. Each die of second pair of forming dies 802 has a respective convex radius of the second pair of convex radii. As depicted, each respective convex radius of the second pair of convex radii is different from the other.

Third die 804 has convex radius 808. Fourth die 806 has convex radius 810. Convex radius 808 and convex radius 810 are not the same. Convex radius 808, convex radius 810, and continuous belt 512 form triangular cross-section 812. As depicted, triangular cross-section 812 is not symmetric around any axis. Triangular cross-section 812 is asymmetric because convex radius 808 and convex radius 810 are not the same.

Second pair of forming dies 802 is positioned to form a first side and a second side of a second substantially triangular cross-section in the composite material blank during forming. In compressing a composite material blank, third die 804 moves in and applies pressure in direction 814. As can be seen from FIG. 8, direction 814 is about perpendicular to the surface of continuous belt 512. In compressing a composite material blank, fourth die 806 moves in and applies pressure in direction 816. Direction 816 is about perpendicular to the surface of continuous belt 512.

As can be seen from FIGS. 7 and 8, the respective convex radii of first pair of forming dies 602 are different from the respective convex radii of second pair of forming dies 802. Specifically, convex radius 704 and convex radius 810 are different.

Figure 9:
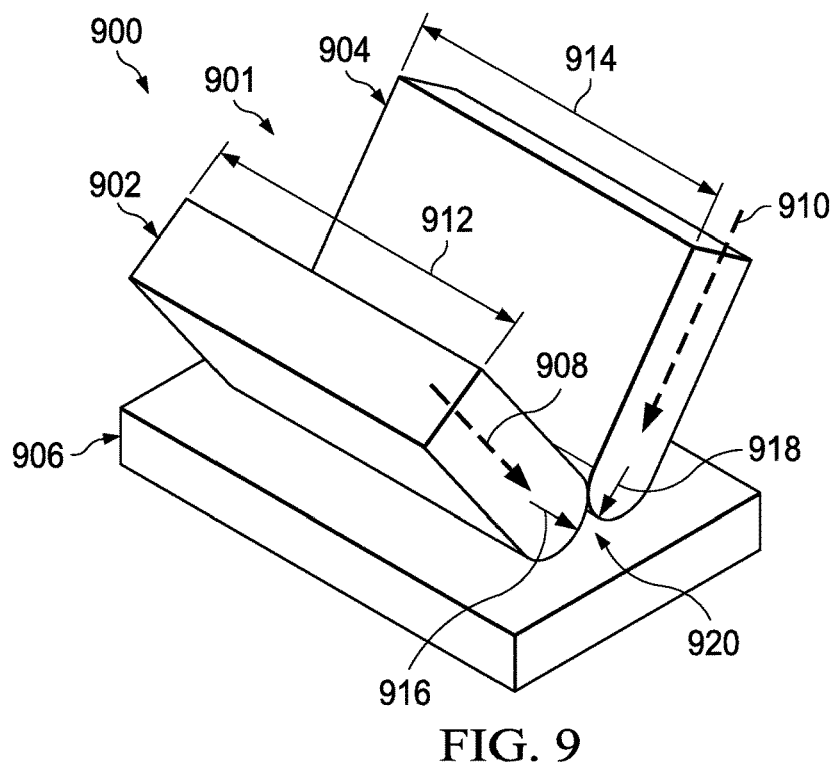
FIG. 9 is an illustration of a simplified version of a pair of dies of a composite filler forming apparatus in accordance with an illustrative embodiment.

Turning now to FIG. 9, an illustration of a simplified version of a pair of dies of a composite filler forming apparatus is depicted in accordance with an illustrative embodiment. View 900 is a simplified view of a pair of forming dies such as first pair of forming dies 370 of FIG. 3. View 900 may be a simplified view of a pair of forming dies of number of pairs of forming dies 502 of FIG. 5.

View 900 includes pair of forming dies 901. Pair of forming dies 901 includes first die 902 and second die 904. View 900 also includes base 906. To form a composite material blank, first die 902 is moved in direction 908 and second die 904 is moved in direction 910. Direction 908 is at about 45 degrees to the surface of base 906. Direction 910 is at about 45 degrees to the surface of base 906.

First die 902 has width 912. Second die 904 has width 914. As depicted, width 912 and width 914 are the same. When forming a composite material blank, a length of the composite material blank equivalent to width 912 and width 914 is formed by first die 902 and second die 904.

First die 902 has convex radius 916. Second die 904 has convex radius 918. Convex radius 916, convex radius 918, and base 906 form a substantially triangular cross-section 920.

Figure 10:
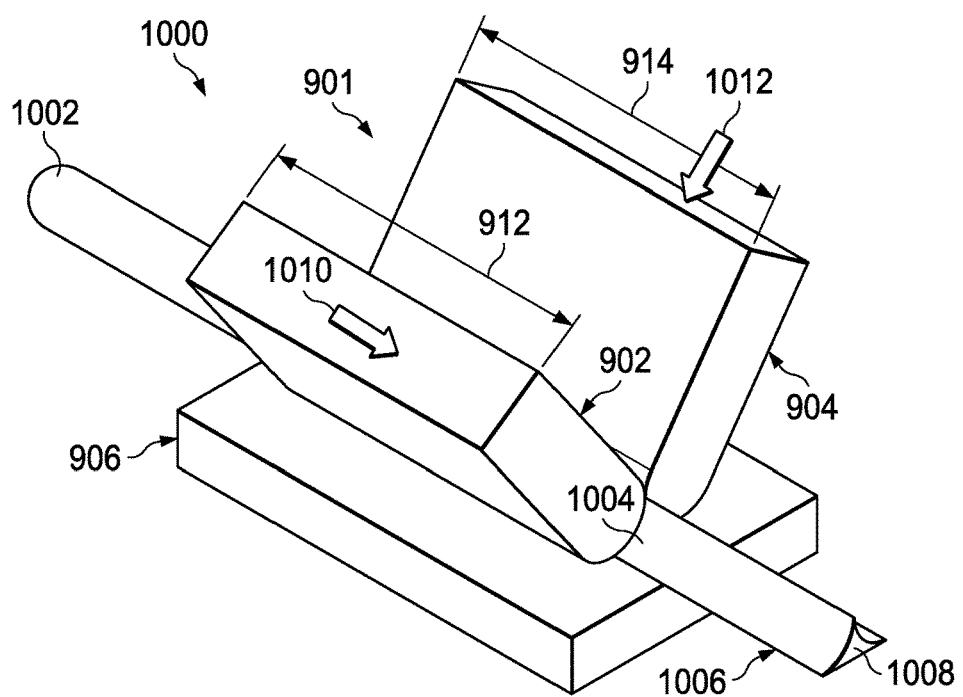
FIG. 10 is an illustration of a simplified version of a pair of dies of a composite filler forming apparatus engaging a composite filler in accordance with an illustrative embodiment.

Turning now to FIG. 10, an illustration of a simplified version of a pair of dies of a composite filler forming apparatus engaging a composite filler is depicted in accordance with an illustrative embodiment. View 1000 is a view of first die 902 and second die 904 contacting a composite material blank.

As depicted, composite material blank 1002 is positioned beneath first die 902 and second die 904. After compression by first die 902 and second die 904, first portion 1004 of composite material blank 1002 is formed into composite filler 1006 having substantially triangular cross-section 1008.

As depicted, a second portion of composite material blank 1002 is between first die 902 and second die 904. First die 902 applies pressure 1010 to the second portion of composite material blank 1002. Second die 904 applies pressure 1012 to the second portion of composite material blank 1002. By applying the pressure to the second portion of composite material blank 1002, the second portion is compressed.

Figure 11:
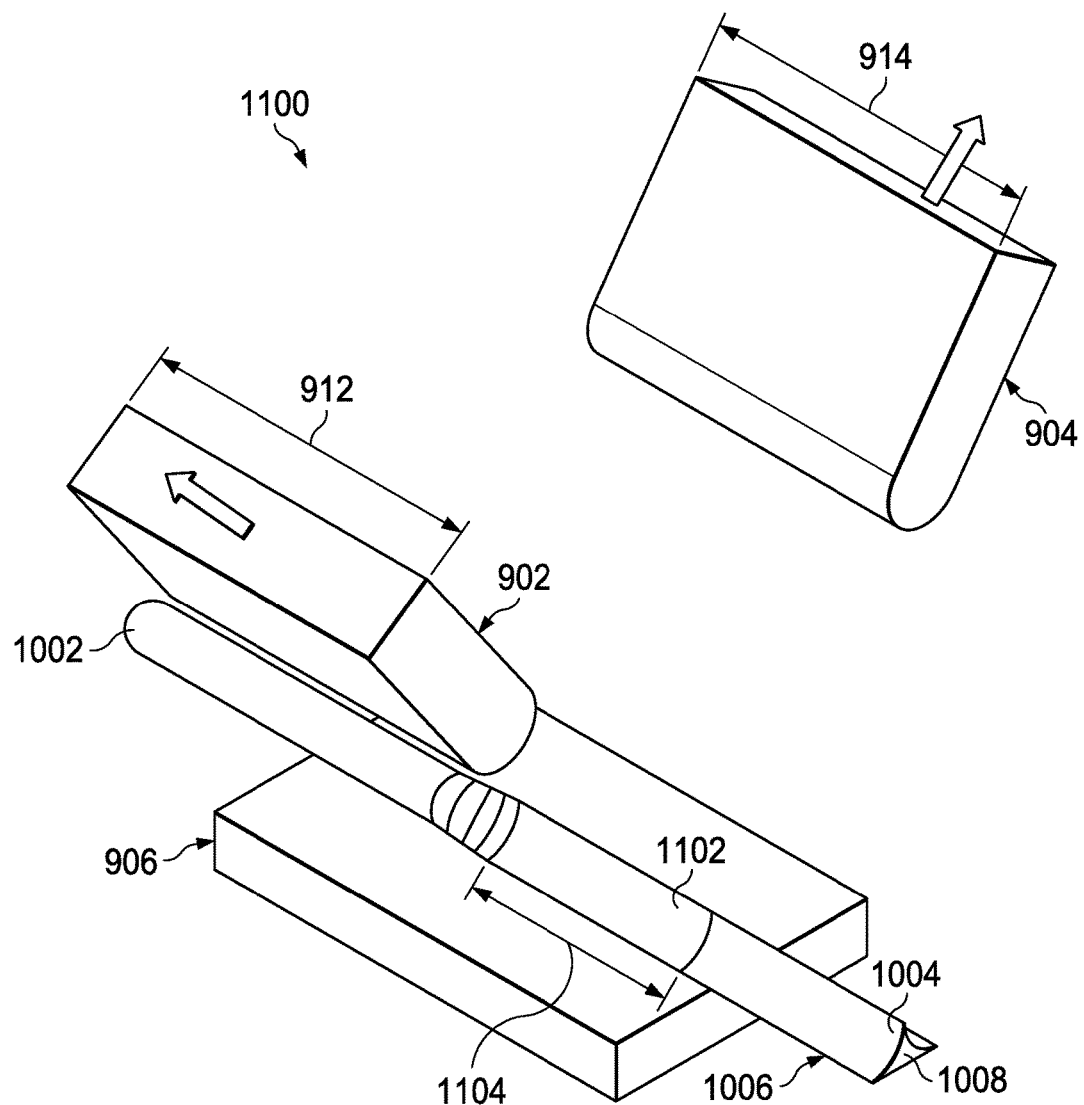
FIG. 11 is an illustration of a simplified version of a pair of dies of a composite filler forming apparatus retracting from a composite filler in accordance with an illustrative embodiment.

Turning now to FIG. 11, an illustration of a simplified version of a pair of dies of a composite filler forming apparatus retracting from a composite filler is depicted in accordance with an illustrative embodiment. View 1100 is a view of retracting first die 902 and second die 904 after applying pressure to a second portion of composite material blank 1002.

Second portion 1102 of composite material blank 1002 has been formed by first die 902 and second die 904 into composite filler 1006. Second portion 1102 has length 1104. Length 1104 is substantially equivalent to width 912 of first die 902 and width 914 of second die 904. As depicted, both first portion 1004 and second portion 1102 of composite filler 1006 have substantially triangular cross-section 1008.

Figure 12:
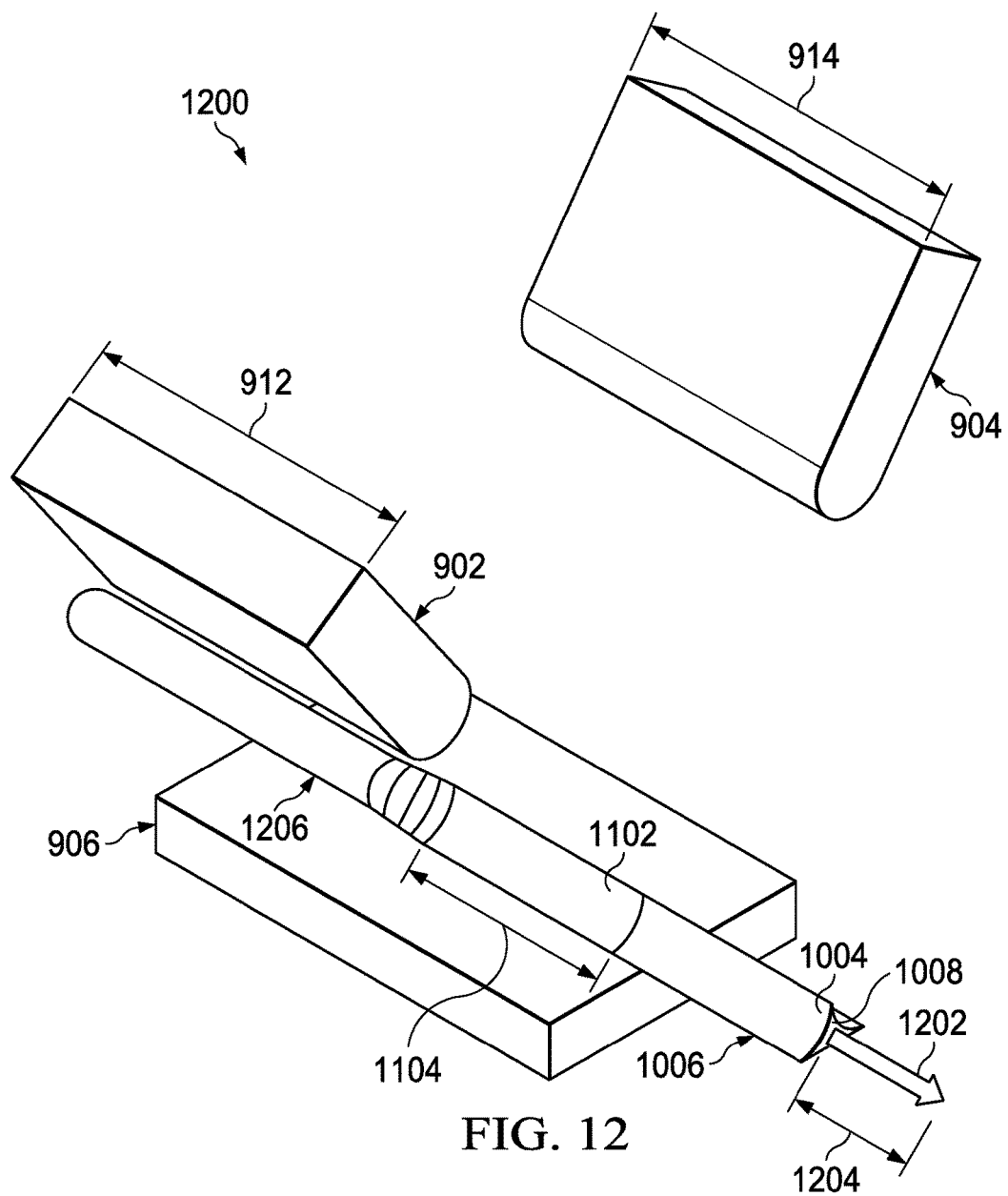
FIG. 12 is an illustration of a simplified version of moving a composite filler relative to a pair of dies of a composite filler forming apparatus in accordance with an illustrative embodiment.

Turning now to FIG. 12, an illustration of a simplified version of moving a composite filler relative to a pair of dies of a composite filler forming apparatus is depicted in accordance with an illustrative embodiment. View 1200 is a view of moving composite material blank 1002 relative to first die 902 and second die 904.

Composite material blank 1002 is moved in direction 1202. By moving composite material blank 1002 relative to first die 902 and second die 904, third portion 1206 is positioned below first die 902 and second die 904.

Composite material blank 1002 is moved desired distance 1204. As depicted, desired distance 1204 is substantially the same as width 912 and width 914. Accordingly, third portion 1206 has not yet been compressed by first die 902 and second die 904. In some illustrative examples, the desired distance may be less than width 912 and width 914. In these illustrative examples, at least part of second portion 1102 will be part of third portion 1206. In other words, at least part of second portion 1102 will be compressed a second time by first die 902 and second die 904.

To move composite material blank 1002, base 906 is also moved in direction 1202. In some illustrative examples, base 906 may take the form of a continuous belt which moves distance 1204 in direction 1202. In other illustrative examples, base 906 may take the form of a plate which moves distance 1204 in direction 1202.

Figure 13:
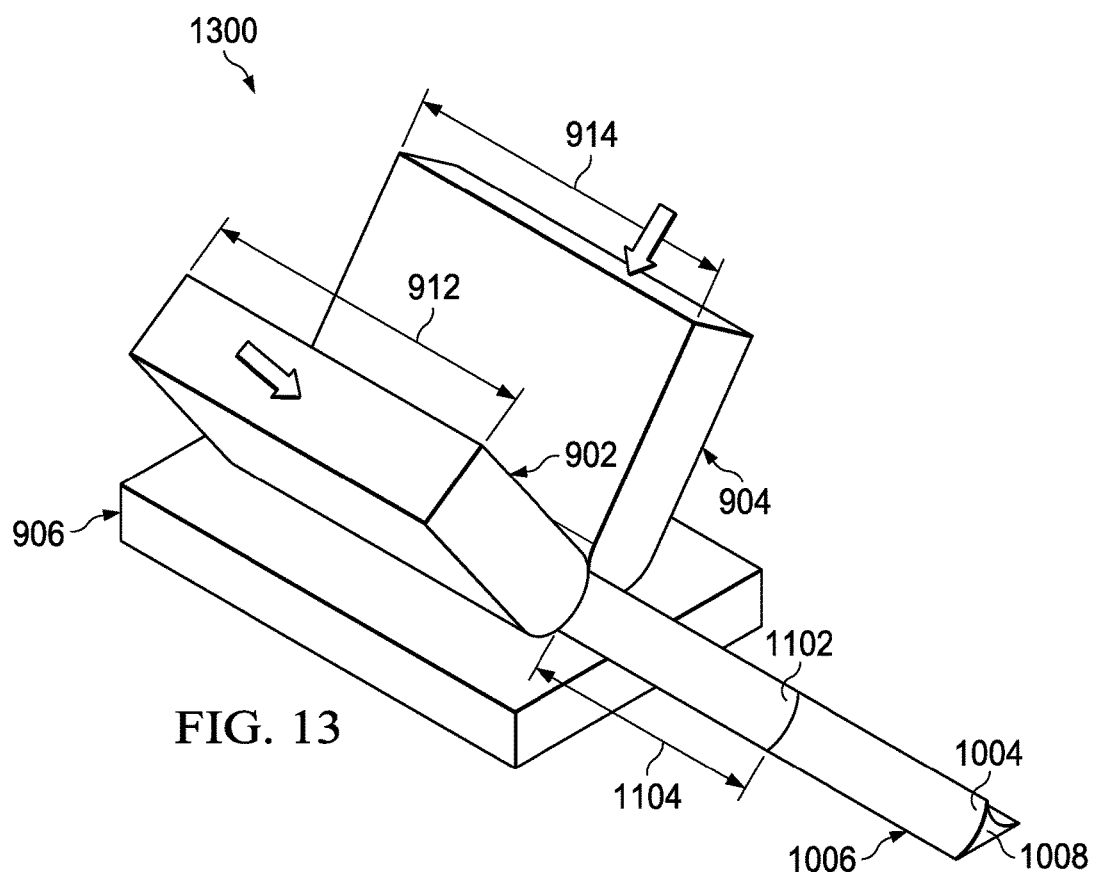
FIG. 13 is an illustration of a simplified version of a pair of dies of a composite filler forming apparatus engaging a composite filler in accordance with an illustrative embodiment.

Turning now to FIG. 13, an illustration of a simplified version of a pair of dies of a composite filler forming apparatus engaging a composite filler is depicted in accordance with an illustrative embodiment. View 1300 is a view of first die 902 and second die 904 repeating the applying step to a subsequent portion of composite material blank 1002 (hidden in this view). Specifically, view 1300 is a view of first die 902 and second die 904 applying a pressure to third portion 1206 (hidden in this view) of composite material blank 1002.

As can be seen from FIGS. 9-13, composite material blank 1002 may be moved and formed in increments. When composite material blank 1002 is moved in increments, composite material blank 1002 may be incrementally formed along its length. Specifically, substantially triangular cross-section 1008 may be formed into composite material blank 1002 incrementally along its length.

Further, as can be seen from FIGS. 9-13, continuous lengths of composite material blank 1002 may be formed by the disclosed composite filler forming apparatus. Accordingly, using the composite filler forming apparatus such as composite filler forming apparatus 308 of FIG. 3 may be described as a continuous process.

Figure 14:
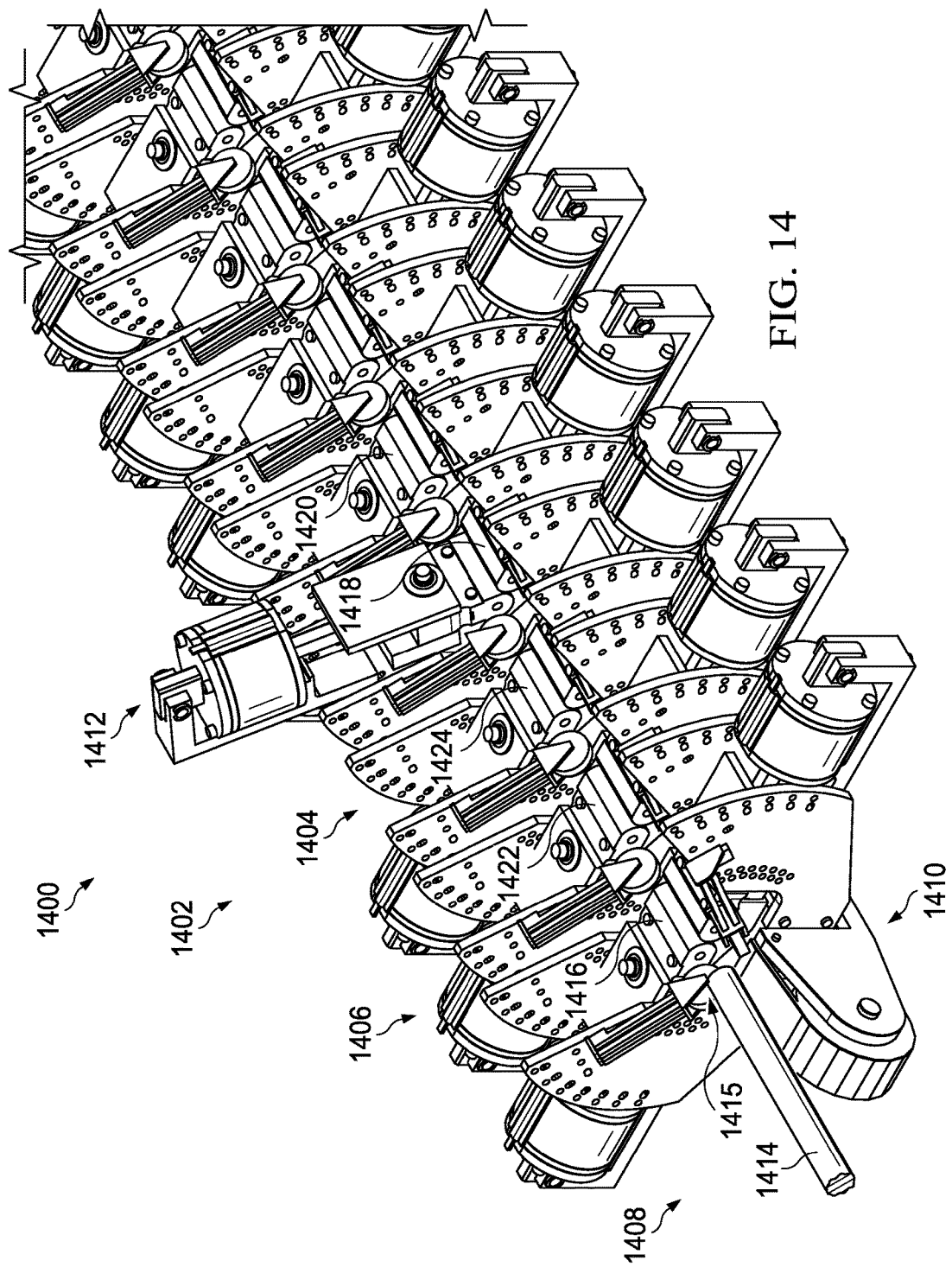
FIG. 14 is an illustration of a composite filler traveling through a composite filler forming apparatus in accordance with an illustrative embodiment.

Turning now to FIG. 14, an illustration of a composite filler traveling through a composite filler forming apparatus is depicted in accordance with an illustrative embodiment. View 1400 may be an enlarged view of a composite filler forming apparatus, such as composite filler forming apparatus 500 of FIG. 5.

Composite filler forming apparatus 1402 includes number of pairs of forming dies 1404, number of adjusters 1406, base 1408, movement mechanism 1410, and plurality of actuators 1412. Composite material blank 1414 enters number of pairs of forming dies 1404 on base 1408. Composite material blank 1414 may be moved beneath number of pairs of forming dies 1404 by increments of a designated distance. Composite material blank 1414 may be formed into a composite filler using number of pairs of forming dies 1404.

As composite material blank 1414 is moved beneath number of pairs of forming dies 1404, rollers 1415 may keep composite material blank 1414 centered within composite filler forming apparatus 1402. Further, rollers 1415 may keep composite material blank 1414 on base 1408 when number of pairs of forming dies 1404 are retracted. Rollers 1415 may restrict movement of composite material blank 1414 to the left or right relative to the longitudinal axis of composite filler forming apparatus 1402. Rollers 1415 may provide sufficient force to maintain the position of composite material blank 1414 relative to the longitudinal axis of composite filler forming apparatus 1402. Rollers 1415 may not provide sufficient force to form composite material blank 1414. Further, rollers 1415 may not provide sufficient force to create "fuzzballs." In some illustrative examples, rollers 1415 may be spring loaded.

In some illustrative examples, a composite filler may be formed using a single pair of forming dies, such as pair of forming dies 1416. The selected pair of forming dies may be dependent on the desired cross-sectional shape for the resulting composite filler. For example, pair of forming dies 1418 may have different respective convex radii than pair of forming dies 1416. Accordingly, in some illustrative examples, pair of forming dies 1418 may be used to form a composite filler rather than pair of forming dies 1416. In other illustrative examples, a composite filler may be formed using a plurality of pairs of forming dies, such as pair of forming dies 1416, pair of forming dies 1418, and pair of forming dies 1420. When each of pair of forming dies 1416, pair of forming dies 1418, and pair of forming dies 1420 has its own respective convex radii different from the respective convex radii of each other pair of forming dies, pair of forming dies 1416, pair of forming dies 1418, and pair of forming dies 1420 may be used to form a composite filler having a varying cross-section. Alternatively, when each of pair of forming dies 1416, pair of forming dies 1418, and pair of forming dies 1420 has its own respective convex radii different from the respective convex radii of each other pair of forming dies, pair of forming dies 1416, pair of forming dies 1418, and pair of forming dies 1420 may form features of a composite filler incrementally.

In some other illustrative examples, each of pair of forming dies 1416, pair of forming dies 1418, and pair of forming dies 1420 may have the same convex radii. In these examples, using pair of forming dies 1416, pair of forming dies 1418, and pair of forming dies 1420 simultaneously may form a longer portion of a composite filler at one time. Using pair of forming dies 1416, pair of forming dies 1418, and pair of forming dies 1420 each having the same convex radii may reduce manufacturing time.

When forming a composite filler, any of number of pairs of forming dies 1404 not having desired convex radii may not be used. For example, when forming a composite filler using pair of forming dies 1416, pair of forming dies 1418, and pair of forming dies 1420, pair of forming dies 1422 and pair of forming dies 1424 may not be used. Accordingly, the associated actuators are not actuated and pair of forming dies 1422 and pair of forming dies 1424 do not contact composite material blank 1414.

Figure 15:
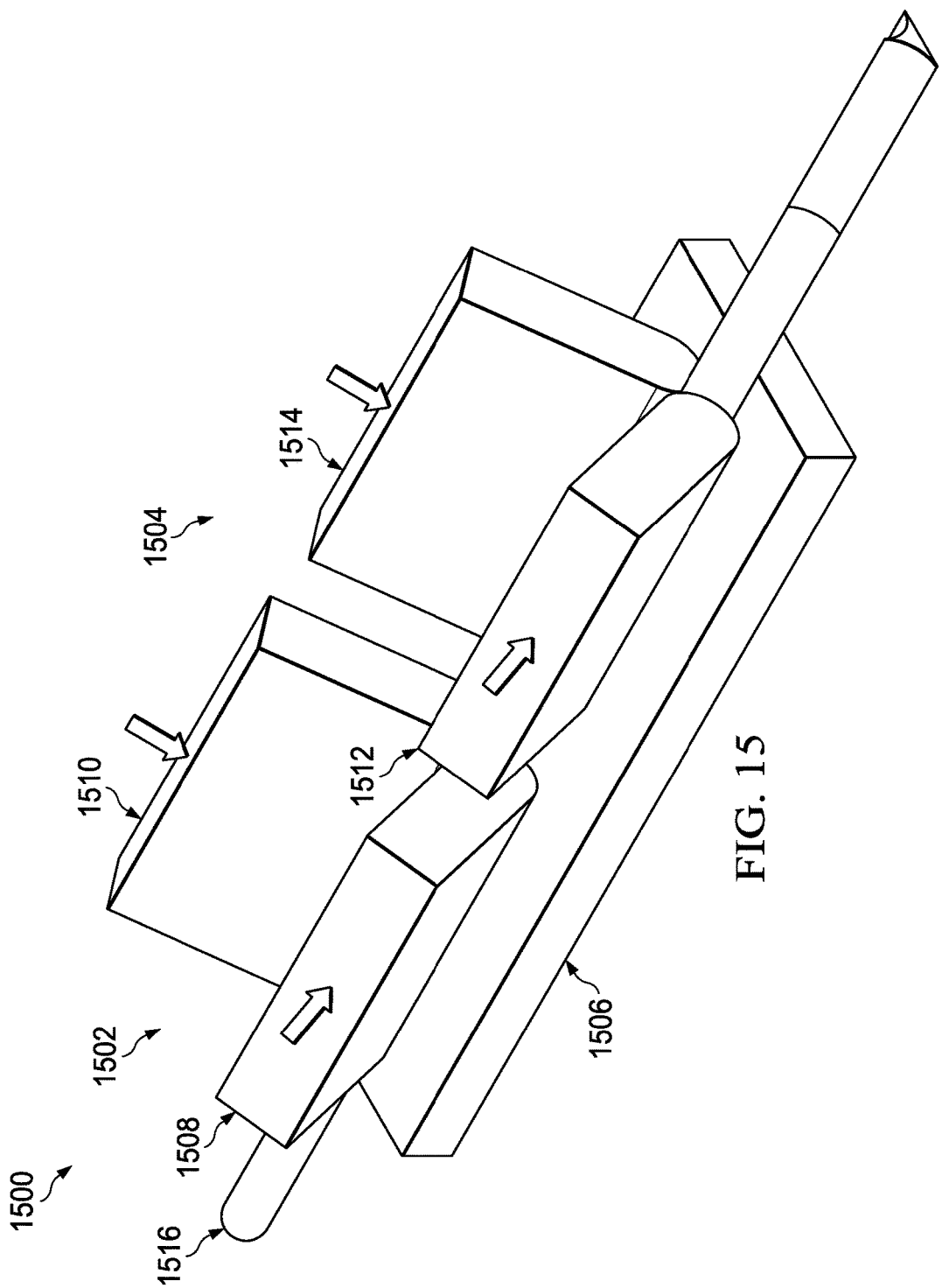
FIG. 15 is an illustration of a simplified version of two pairs of dies of a composite filler forming apparatus engaging a composite filler in accordance with an illustrative embodiment.

Turning now to FIG. 15, an illustration of a simplified version of two pairs of dies of a composite filler forming apparatus engaging a composite filler is depicted in accordance with an illustrative embodiment. View 1500 may be a simplified view of two pairs of forming dies of number of pairs of forming dies 344 of FIG. 3. View 1500 includes first pair of forming dies 1502, second pair of forming dies 1504, and base 1506. First pair of forming dies 1502 includes first die 1508 and second die 1510. Second pair of forming dies 1504 includes third die 1512 and fourth die 1514.

As depicted, first pair of forming dies 1502 and second pair of forming dies 1504 are simultaneously compressing composite material blank 1516. By simultaneously applying pressure to composite material blank 1516 with multiple pairs of forming dies, manufacturing improvements may be achieved. For example, manufacturing time may be reduced.

Each die of first pair of forming dies 1502 has a respective convex radius. Each die of second pair of forming dies 1504 has a respective convex radius. The respective convex radii of first pair of forming dies 1502 may be the same as the respective convex radii of second pair of forming dies 1504. When the respective convex radii of first pair of forming dies 1502 is the same as the respective convex radii of second pair of forming dies 1504, applying pressure to composite material blank 1516 simultaneously using first pair of forming dies 1502 and second pair of forming dies 1504 may increase the length of composite material blank 1516 formed into a substantially triangular cross-section during a period of time.

In some illustrative examples, when the respective convex radii of first pair of forming dies 1502 is different than the respective convex radii of second pair of forming dies 1504, applying pressure to composite material blank 1516 simultaneously using first pair of forming dies 1502 and second pair of forming dies 1504 may form a composite filler having a varying cross-section. In some illustrative examples, when the respective convex radii of first pair of forming dies 1502 is different than the respective convex radii of second pair of forming dies 1504, applying pressure to composite material blank 1516 simultaneously using first pair of forming dies 1502 and second pair of forming dies 1504 may incrementally form sides of a composite filler. By incrementally forming sides of a composite filler, desirable material properties of the composite filler may be maintained.

Figure 16:
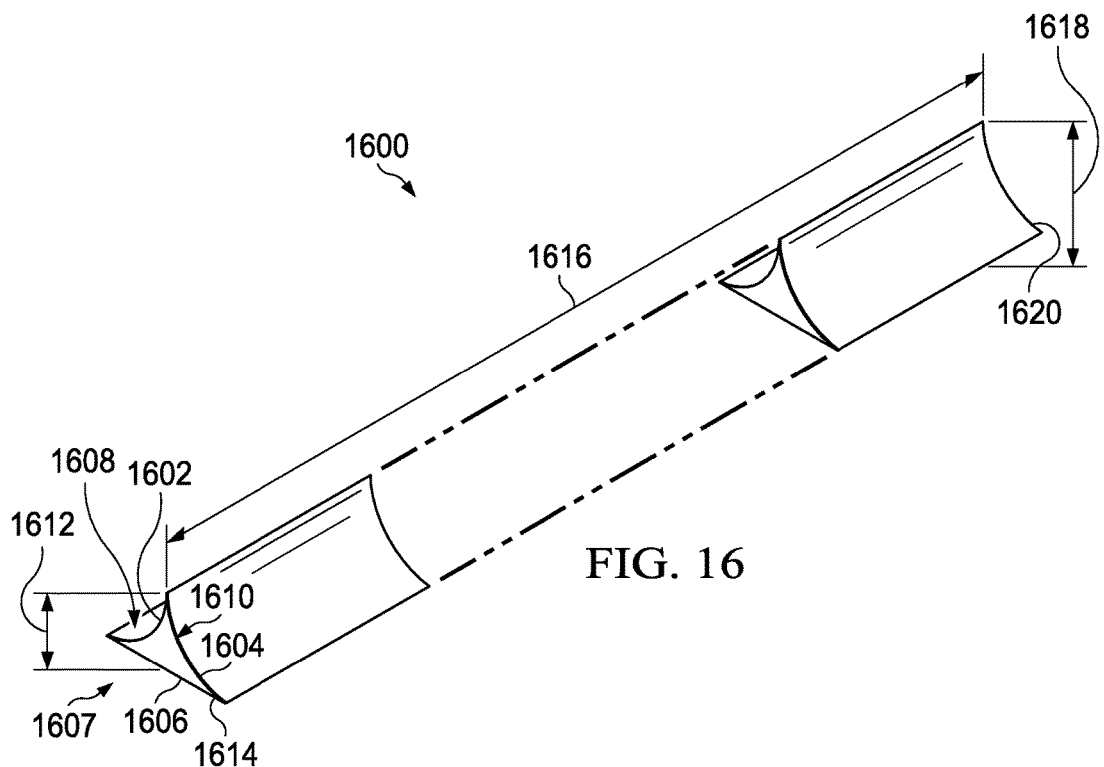
FIG. 16 is an illustration of a composite filler having varying height in accordance with an illustrative embodiment.

Turning now to FIG. 16, an illustration of a composite filler having varying height is depicted in accordance with an illustrative embodiment. Composite filler 1600 may be formed in manufacturing environment 300 of FIG. 3. Composite filler 1600 may be formed using composite filler forming apparatus 500 of FIG. 5.

As depicted, composite filler 1600 has first side 1602, second side 1604, and third side 1606 which form substantially triangular cross-section 1607. First side 1602 has concave radius 1608. Second side 1604 has concave radius 1610. As can be seen from FIG. 16, concave radius 1608 and concave radius 1610 are substantially the same.

Composite filler 1600 has height 1612 at end 1614. Composite filler 1600 increases from height 1612 over length 1616. Composite filler 1600 has height 1618 at end 1620.

Composite filler 1600 may be formed by a plurality of pairs of forming dies. In some illustrative examples, composite filler 1600 may be formed by the plurality of pairs of forming dies being actuated simultaneously. In other illustrative examples, features of composite filler 1600 may be formed incrementally by applying a plurality of pairs of forming dies.

Figure 17:
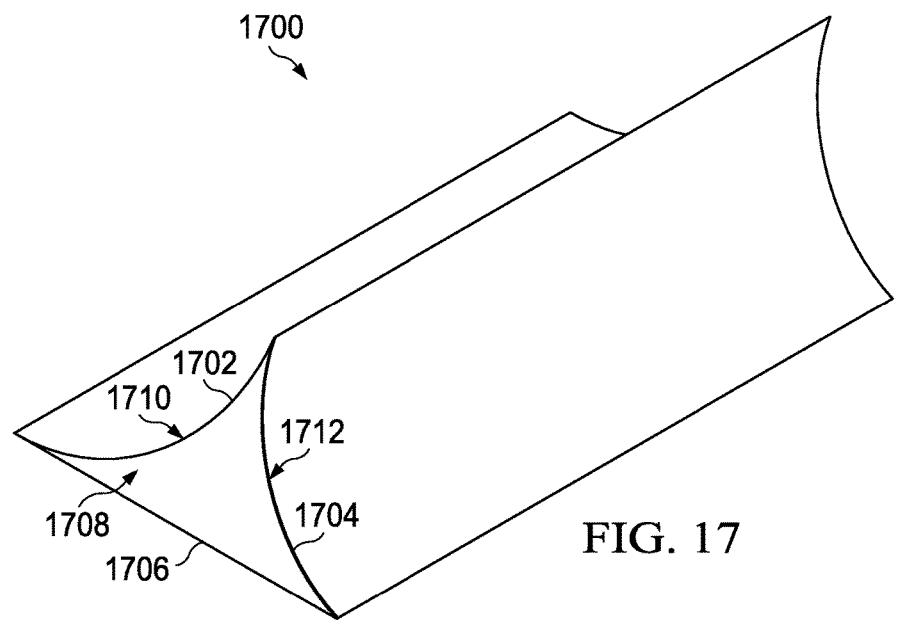
FIG. 17 is an illustration of a composite filler having two different convex radii in accordance with an illustrative embodiment.

Turning now to FIG. 17, an illustration of a composite filler having two different convex radii is depicted in accordance with an illustrative embodiment. Composite filler 1700 may be formed in manufacturing environment 300 of FIG. 3. Composite filler 1700 may be formed using composite filler forming apparatus 500 of FIG. 5.

As depicted, composite filler 1700 has first side 1702, second side 1704, and third side 1706 which form substantially triangular cross-section 1708. First side 1702 has concave radius 1710. Second side 1704 has concave radius 1712. As can be seen from FIG. 17, concave radius 1710 and concave radius 1712 are different. Concave radius 1710 and concave radius 1712 are formed by respective convex radii of a pair of forming dies. In other words, the respective convex radii are different from each other, resulting in concave radius 1710 and concave radius 1712 which are different from each other.

In some illustrative examples, substantially triangular cross-section 1708 may be formed by a single pair of forming dies. In some illustrative examples, substantially triangular cross-section 1708 may be formed by a plurality of pairs of forming dies. In some examples, each pair of forming dies in the plurality of pairs of forming dies incrementally forms substantially triangular cross-section 1708. In these examples, each pair of forming dies in a plurality of pairs of forming dies may progressively form each of concave radius 1710 and concave radius 1712. In some illustrative examples, the plurality of pairs of forming dies may each be substantially the same. In these examples, the plurality of pairs of forming dies may each be actuated simultaneously to produce a longer portion of composite filler 1700 than would have been formed by a single pair of forming dies.

The illustrations of manufacturing environment 300 in FIG. 3, composite filler forming apparatus depictions in FIGS. 4-15, composite filler depictions in FIGS. 3, 16, and 17, and aircraft depictions in FIG. 1 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

The different components shown in FIGS. 1-2 and 4-17 may be combined with components in FIG. 3, used with components in FIG. 3, or a combination of the two. Additionally, some of the components in FIGS. 1-2 and 4-17 may be illustrative examples of how components shown in block form in FIG. 3 may be implemented as physical structures.

Figure 18:
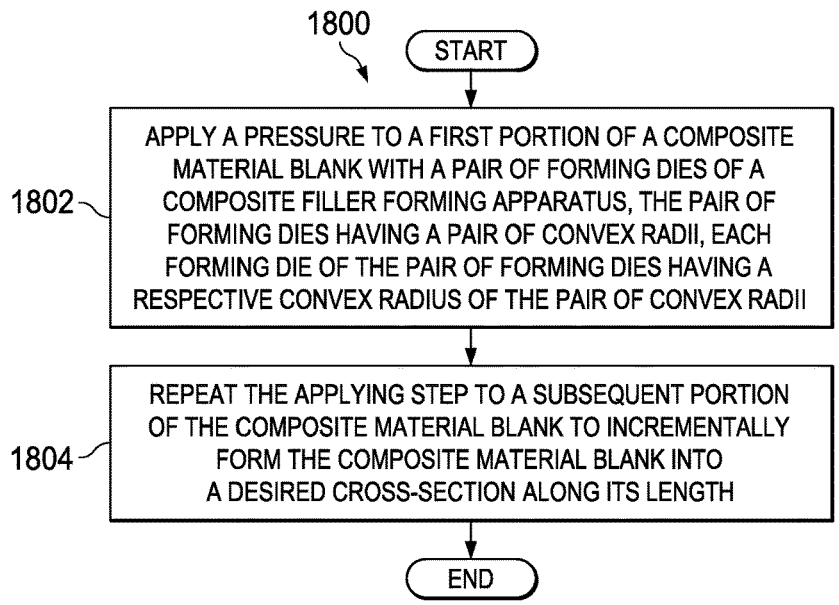
FIG. 18 is an illustration of a flowchart of a process for forming a composite filler in accordance with an illustrative embodiment.

Turning now to FIG. 18, an illustration of a flowchart of a process for forming a composite filler is depicted in accordance with an illustrative embodiment. Process 1800 may be used to form composite filler 310 of FIG. 3. Process 1800 may begin by applying a pressure to a first portion of a composite material blank with a pair of forming dies of a composite filler forming apparatus, each forming die of the pair of forming dies having a respective convex radius (operation 1802). The pair of forming dies may be first pair of forming dies 370 of FIG. 3. The pair of forming dies may be first pair of forming dies 602 of FIGS. 6 and 7. One depiction of applying the pressure to a first portion of the composite material blank may be seen in FIG. 10. Process 1800 may then repeat the applying step to a subsequent portion of the composite material blank to incrementally form the composite material blank into a desired cross-section along its length (operation 1804). One depiction of repeating the applying step to a subsequent portion of the composite material blank may be seen in FIG. 13. Afterwards, the process terminates.

Figure 19:
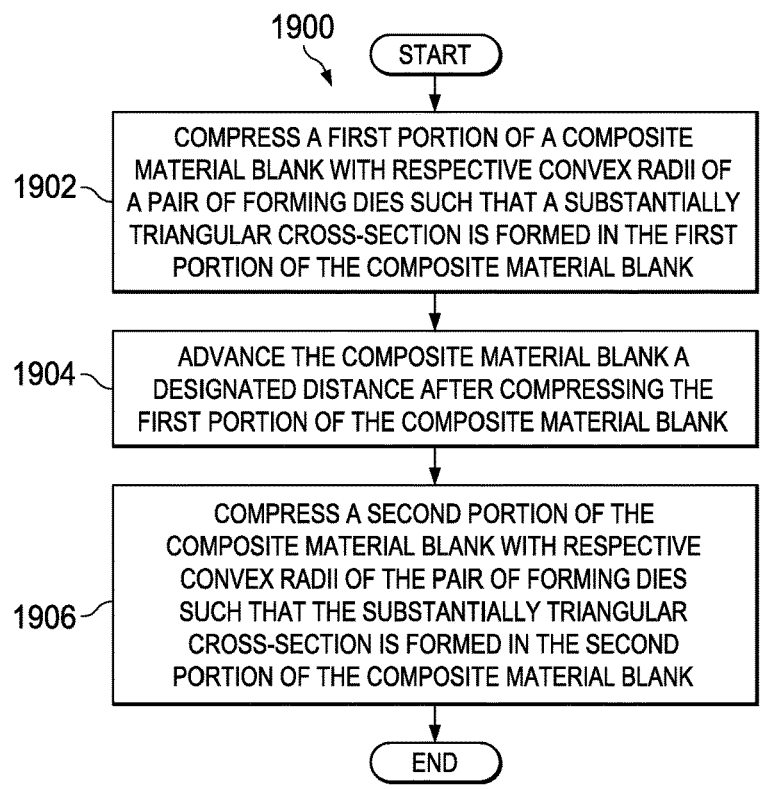
FIG. 19 is an illustration of a flowchart of a process for forming a composite filler in accordance with an illustrative embodiment.

Turning now to FIG. 19, an illustration of a flowchart of a process for forming a composite filler is depicted in accordance with an illustrative embodiment. Process 1900 may be used to form composite filler 310 of FIG. 3.

Process 1900 may begin by compressing a first portion of a composite material blank with respective convex radii of a pair of forming dies such that a substantially triangular cross-section is formed in the first portion of the composite material blank (operation 1902). The pair of forming dies may be first pair of forming dies 370 of FIG. 3. The pair of forming dies may be first pair of forming dies 602 of FIGS. 6 and 7. One depiction of compressing the first portion of the composite material blank with the respective convex radii of the pair of forming dies may be seen in FIG. 10. Process 1900 may then advance the composite material blank a designated distance after compressing the first portion of the composite material blank (operation 1904). In some illustrative examples, the designated distance is about the same as a width of the pair of forming dies. In some other illustrative examples, the designated distance is less than a width of the pair of forming dies. In some illustrative examples, the pair of forming dies is part of a composite filler forming system having a number of pairs of forming dies, and the designated distance is sufficient to remove the first portion of the composite material blank from the forming system.

Process 1900 may then compress a second portion of the composite material blank with respective convex radii of the pair of forming dies such that the substantially triangular cross-section is formed in the second portion of the composite material blank (operation 1906). Afterwards, the process terminates. In illustrative examples in which the designated distance is less than the width of the pair of forming dies, the second portion overlaps the first portion of the composite material blank.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, process 1800 may further comprise advancing the composite material blank on a base of the composite filler forming apparatus a designated distance prior to repeating the applying step. In some examples, this designated distance is about the same as a width of the pair of forming dies.

In some illustrative examples, in process 1800, applying the pressure to the first portion of the composite material blank with the pair of forming dies comprises pressing the composite material blank with each respective convex radius to form a substantially triangular cross-section in the first portion of the composite material blank.

In some illustrative examples, in process 1800, the repeating step comprises advancing a composite material blank within a composite filler forming apparatus on a base of the composite filler forming apparatus a designated distance and applying a pressure to a second portion of the composite material blank with the pair of forming dies, each forming die of the pair of forming dies having the respective convex radius, wherein the designated distance is less than a width of the pair of forming dies. In some illustrative examples, process 1800 further comprises heating the first portion of the composite material blank at least one of before applying the pressure or while applying the pressure to the first portion of the composite material blank.

In some illustrative examples, in process 1800, the pressure is a first pressure, the portion is a first portion, and the pair of forming dies is a first pair of forming dies. In these illustrative examples, process 1800 further comprises applying a second pressure to a second portion of the composite material blank with a second pair of forming dies as the first pair of forming dies applies the first pressure to the first portion of the composite material blank, each forming die of the second pair of forming dies having a respective convex radius.

In some of these illustrative examples, this applying of the first pressure to the first portion of the composite material blank with the first pair of forming dies forms a first substantially triangular cross-section in the first portion of the composite material blank, and applying a second pressure to the second portion of the composite material blank with the second pair of forming dies forms a second substantially triangular cross-section in the second portion of the composite material blank, wherein the second substantially triangular cross-section is different than the first substantially triangular cross-section. In some others of these illustrative examples, the respective convex radii of the first pair of forming dies are the same as the respective convex radii of the second pair of forming dies.

In some others of these illustrative examples, process 1800 may further comprise applying a second pressure to at least part of the first portion of the composite material blank with the second pair of forming dies after applying the first pressure to the first portion of the composite material blank with the first pair of forming dies. In some illustrative examples, process 1800 further comprises advancing the pair of forming dies of the composite filler forming apparatus a designated distance relative to the composite material blank prior to repeating the applying step.

Figure 20:
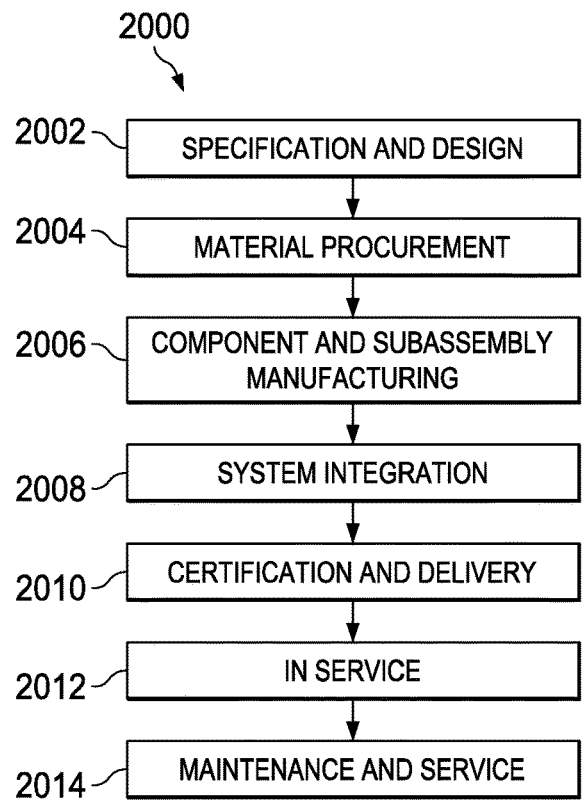
FIG. 20 is an illustration of a block diagram of an aircraft manufacturing and service method in accordance with an illustrative embodiment.
Figure 21:
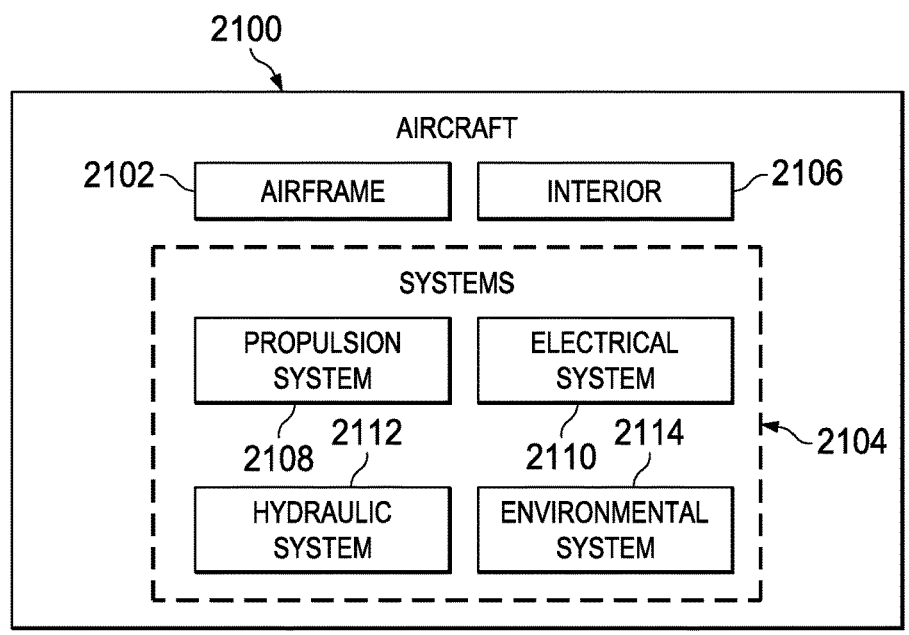
FIG. 21 is an illustration of a block diagram of an aircraft in which an illustrative embodiment may be implemented.

The illustrative embodiments of the disclosure may be described in the context of aircraft manufacturing and service method 2000 as shown in FIG. 20 and aircraft 2100 as shown in FIG. 21. Turning first to FIG. 20, an illustration of a block diagram of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of a block diagram of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry. The apparatuses and methods embodied herein may be employed during at least one of the stages of aircraft manufacturing and service method 2000 in FIG. 20.

One or more illustrative embodiments may be used during component and subassembly manufacturing 2006. For example, composite filler forming apparatus 308 may be used to form composite filler 310 during component and subassembly manufacturing 2006. Further, composite filler 310 formed by composite filer forming apparatus 308 may also be used to replace a composite filler during maintenance and service 2014.

The illustrative embodiments provide an apparatus and method for forming a composite filler. Specifically, the illustrative embodiments provide an apparatus and method for incrementally forming a composite material blank along its length to form a composite filler. The illustrative embodiments provide an apparatus capable of forming composite fillers of different cross-sections. The illustrative embodiments provide an apparatus for forming a composite filler having a desirable manufacturing time and a desirable quality.

As the composite material blank does not slide against any forming surfaces, there is little to no friction force. Further, as the composite material blank does not slide against any forming surfaces, there is a lower pull force than conventional roller forming.

In the illustrative examples, the forming force is applied over the width of the pair of forming dies. As a result, the forming force is applied over a number of inches substantially simultaneously.

The rate of incrementally forming composite fillers according to the illustrative examples may be substantially the same as roller forming. The quality of the resulting composite fillers from these illustrative methods may be close to the quality of composite fillers produced by conventional closed die forming. The quality of the resulting composite fillers from these illustrative methods may be greater than composite fillers produced by conventional roller forming.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a frame;
   a base connected to the frame, the base configured to carry a composite material blank;
   a first adjuster connected to the frame, the first adjuster comprising a material that extends outwardly away from the frame in at least two perpendicular dimensions comprising a horizontal direction relative to the frame and a vertical direction relative to the frame;
   a first actuator connected to the first adjuster and configured to press a first forming die towards the base, wherein:
      the first actuator is attached to a first member having a first end distal from the base and a second end proximate the base, wherein the first end is moveable along at least the vertical direction;
      the first forming die is connected to the second end, the first forming die having a first convex radius positioned to form a first side of a substantially triangular cross-section in the composite material blank;
   a second adjuster connected to the frame, the second adjuster comprising a material that extends outwardly away from the frame in the at least two perpendicular dimensions, the second adjuster opposite the first adjuster relative to the base;
   a second actuator connected to the second adjuster and configured to press a second forming die towards the base, wherein,
      the second actuator is attached to a second member having a third end distal from the base and a fourth end proximate the base and opposite the second end of the first member relative to the base, wherein the third end is moveable along at least the vertical; and
      the second forming die is connected to the fourth end, the second forming die having a second convex radius positioned to form a second side of the substantially triangular cross-section in the composite material blank.

2. The apparatus of claim 1, wherein the base is a belt.

3. The apparatus of claim 1, wherein the first convex radius and the second convex radius are different from the other.

4. The apparatus of claim 1 further comprising:
the first adjuster and the second adjuster holding the first forming die and the second forming die at respective angles relative to the composite material blank.

5. The apparatus of claim 1, wherein the substantially triangular cross-section is a first substantially triangular cross-section and further comprising:
a second pair of forming dies, the second pair of forming dies having a second pair of convex radii, each forming die of the second pair of forming dies having a respective convex radius of the second pair of convex radii, the second pair of forming dies positioned to form a first side and a second side of a second substantially triangular cross-section in the composite material blank.

6. The apparatus of claim 5, wherein the second pair of convex radii of the second pair of forming dies is different from the first convex radius and the second convex radius.

7. The apparatus of claim 5, wherein the second pair of convex radii of the second pair of forming dies is the same as the first convex radius and the second convex radius.

8. A method using an apparatus, the apparatus comprising a frame; a base connected to the frame, the base configured to carry a composite material blank; a first adjuster connected to the frame, the first adjuster comprising a material that extends outwardly away from the frame in at least two perpendicular dimensions comprising a horizontal direction relative to the frame and a vertical direction relative to the frame; a first member connected to the first adjuster, the first member having a first end distal from the base and a second end proximate the base, wherein the first end is moveable along at least the vertical direction; a first forming die connected to the second end, the first forming die having a first convex radius positioned to form a first side of a substantially triangular cross section in the composite material blank; a first actuator connected to the first member and configured to press the first forming die towards the base; a second adjuster connected to the frame, the second adjuster comprising a material that extends outwardly away from the frame in the at least two perpendicular dimensions, the second adjuster opposite the first adjuster relative to the base; a second member connected to the second adjuster, the second member having a third end distal from the base and a fourth end proximate the base and opposite the second end of the first member relative to the base, wherein the third end is moveable along at least the vertical direction; a second forming die connected to the fourth end, the second forming die having a second convex radius positioned to form a second side of the substantially triangular cross section in the composite material blank; and a second actuator connected to the second member and configured to press the second forming die towards the base, and wherein the method comprises:
undergoing an applying step where pressure is applied to a first portion of a composite material blank with the first forming die and the second forming die; and
undergoing a repeating step where the applying step is repeated to a subsequent portion of the composite material blank to incrementally form the composite material blank into a desired cross-section along its length.

9. The method of claim 8 further comprising:
advancing the composite material blank on the base a designated distance prior to repeating the applying step.

10. The method of claim 9, wherein the designated distance is about the same as a width of the first forming die and the second forming die.

11. The method of claim 8, wherein applying the pressure to the first portion of the composite material blank comprises:
pressing the composite material blank with the first convex radius of the first forming die and the second convex radius of the second forming die to form a substantially triangular cross-section in the first portion of the composite material blank.

12. The method of claim 8, wherein the repeating step comprises:
advancing the composite material blank within the apparatus on the base a designated distance; and
applying the pressure to a second portion of the composite material blank with the first forming die and the second forming die, wherein the designated distance is less than a width of the first forming die and the second forming die.

13. The method of claim 8 further comprising:
heating the first portion of the composite material blank at least one of before applying the pressure or while applying the pressure to the first portion of the composite material blank.

14. The method of claim 8, wherein the pressure is a first pressure, and further comprising:
applying a second pressure to a second portion of the composite material blank with a second pair of forming dies as the first forming die and the second forming die applies the first pressure to the first portion of the composite material blank, the second pair of forming dies having a second pair of convex radii, each forming die of the second pair of forming dies having a respective convex radius of the second pair of convex radii.

15. The method of claim 14, wherein applying the first pressure to the first portion of the composite material blank with the first forming die and the second forming die forms a first substantially triangular cross-section in the first portion of the composite material blank, and wherein applying the second pressure to the second portion of the composite material blank with the second pair of forming dies forms a second substantially triangular cross section in the second portion of the composite material blank, wherein the second substantially triangular cross section is different than the first substantially triangular cross-section.

16. The method of claim 14, wherein the first convex radius and the second convex radius are the same as the second pair of convex radii of the second pair of forming dies.

17. The method of claim 14 further comprising:
applying the second pressure to at least part of the first portion of the composite material blank with the second pair of forming dies after applying the first pressure to the first portion of the composite material blank with the first forming die and the second forming die.

18. The method of claim 8 further comprising:
advancing the apparatus a designated distance relative to the composite material blank prior to repeating the applying step.

19. A method using an apparatus, the apparatus comprising a frame; a base connected to the frame, the base configured to carry a composite material blank; a first adjuster connected to the frame, the first adjuster comprising a material that extends outwardly away from the frame in at least two perpendicular dimensions comprising a horizontal direction relative to the frame and a vertical direction relative to the frame; a first member connected to the first adjuster, the first member having a first end distal from the base and a second end proximate the base, wherein the first end is moveable along at least the vertical direction; a first forming die connected to the second end, the first forming die having a first convex radius positioned to form a first side of a substantially triangular cross section in the composite material blank; a first actuator connected to the first member and configured to press the first forming die towards the base; a second adjuster connected to the frame, the second adjuster comprising a material that extends outwardly away from the frame in the at least two perpendicular dimensions, the second adjuster opposite the first adjuster relative to the base; a second member connected to the second adjuster, the second member having a third end distal from the base and a fourth end proximate the base and opposite the second end of the first member relative to the base, wherein the third end is moveable along at least the vertical direction; a second forming die connected to the fourth end, the second forming die having a second convex radius positioned to form a second side of the substantially triangular cross section in the composite material blank; and a second actuator connected to the second member and configured to press the second forming die towards the base, and wherein the method comprises:

compressing a first portion of a composite material blank with the first convex radius and the second convex radius such that a substantially triangular cross-section is formed in the first portion of the composite material blank;

advancing the composite material blank a designated distance after compressing the first portion of the composite material blank; and compressing a second portion of the composite material blank with the first convex radius and the second convex radius such that the substantially triangular cross-section is formed in the second portion of the composite material blank.

20. The method of claim 19, wherein the second portion overlaps the first portion of the composite material blank.

21. The method of claim 19, wherein the first forming die and the second forming die are part of a composite filler forming system having a number of pairs of forming dies, and wherein the designated distance is sufficient to remove the first portion of the composite material blank from the composite filler forming system.

* * * * *